United States Patent [19]
Otsu et al.

[11] Patent Number: 5,903,477
[45] Date of Patent: May 11, 1999

[54] SIMULATION APPARATUS AND SIMULATION METHOD FOR ELECTROMAGNETIC FIELD INTENSITY USING MOMENT METHOD

[75] Inventors: Shinichi Otsu; Makoto Mukai, both of Kawasaki, Japan

[73] Assignee: Fujitsu Limited, Kawasaki, Japan

[21] Appl. No.: 08/803,166

[22] Filed: Feb. 19, 1997

[30] Foreign Application Priority Data

Apr. 10, 1996 [JP] Japan ................................. 8-088213

[51] Int. Cl.[6] ............................................ G06F 9/455
[52] U.S. Cl. ............................................ 364/578; 364/490
[58] Field of Search ............................. 395/500; 364/488, 364/489, 490, 491, 578; 607/101

[56] References Cited

U.S. PATENT DOCUMENTS 5,745,370  4/1998  Ohtsu et al. ............................ 364/488

OTHER PUBLICATIONS

Interpretation of Scattering Phenomenonology in Slotted Waveguide Structures via Time–Frequency Processing, Trintinalia and Ling, Nov. 1995, pp. 1253–1261.

Primary Examiner—Kevin J. Teska
Assistant Examiner—Dan Fiul
Attorney, Agent, or Firm—Staas & Halsey

[57] ABSTRACT

A simulation apparatus, using the moment method and at high speed, simulates the intensity of an electromagnetic field, etc. of a time domain. A transforming unit obtains a frequency spectrum by segmenting time series data of a wave source and applying a Fourier transform thereto. A calculating unit calculates the mutual impedance at a sampling frequency, generates an approximate expression of the mutual impedance from the calculated mutual impedance and the sampling frequency and calculates the mutual impedance at respective frequencies obtained by the transforming unit by using the generated approximate expression. A simulating unit finds a current spectrum flowing in each element, according to the moment method, from the mutual impedance calculated by the calculating unit and the frequency spectrum obtained by the transforming unit and finds the spectrum of a voltage, an electric field, and a magnetic field from the found current spectrum. An inverse transforming unit applies an inverse Fourier transform to the spectra found by the simulating unit and outputs the result.

40 Claims, 44 Drawing Sheets

Fig.4A $$Z = j\omega \iint_S \left[ \frac{\mu}{4\pi} J_1 J_2 \cos\phi \frac{e^{-jkr}}{r} + \frac{1}{4\pi\varepsilon} \rho_1 \rho_2 \frac{e^{-jkr}}{r} \right] ds$$

Fig.4B $$Z_{13} = \frac{j\omega\mu}{4\pi \sin kd_1 \sin kd_3} \int_{t_0}^{t_1}\int_{z_0}^{z_1} [\sin k(z-z_0) \sin k(t-t_0) \cos\phi \\ -\cos k(z-z_0) \cos k(t-t_0)] \frac{e^{-jkr}}{r} dzdt$$

$$Z_{14} = \frac{j\omega\mu}{4\pi \sin kd_1 \sin kd_4} \int_{t_1}^{t_2}\int_{z_0}^{z_1} [\sin k(z-z_0) \sin k(-t+t_2) \cos\phi_2 \\ +\cos k(z-z_0) \cos k(-t+t_2)] \frac{e^{-jkr}}{r} dzdt$$

Fig.5A $$\frac{j\omega\mu}{4\pi\sin kd_1 \sin kd_3} = j\frac{c\mu}{4\pi} \frac{k}{\sin kd_1 \sin kd_3} = j\alpha \frac{k}{A_1}$$

$$\frac{j\omega\mu}{4\pi\sin kd_1 \sin kd_4} = j\frac{c\mu}{4\pi} \frac{k}{\sin kd_1 \sin kd_4} = j\alpha \frac{k}{A_2}$$

Fig.5B $$Z_{13} = j\alpha \frac{k}{A_1} e^{-jkr_0} \int_{t_0}^{t_1} \int_{z_0}^{z_1} [\sin k(z-z_0)\sin k(t-t_0)\cos\phi$$
$$-\cos k(z-z_0)\cos k(t-t_0)] \frac{e^{-jkd}}{r} dzdt$$

$$Z_{14} = j\alpha \frac{k}{A_1} e^{-jkr_0} \int_{t_1}^{t_2} \int_{z_0}^{z_1} [\sin k(z-z_0)\sin k(-t+t_2)\cos\phi_2$$
$$+\cos k(z-z_0)\cos k(-t+t_2)] \frac{e^{-jkd}}{r} dzdt$$

$$R_1 = \alpha \frac{k}{A_1} \int_{t_0}^{t_1} \int_{z_0}^{z_1} [\sin ku \sin kv \cos\phi_1 - \cos ku \cos kv] \frac{\sin kd}{r} dzdt$$

$$= \alpha \frac{k}{A_1} \int_{t_0}^{t_1} \int_{z_0}^{z_1} \{[ku - \frac{(ku)^3}{6}][kv - \frac{(kv)^3}{6}] \cos\phi_1$$

$$-[1 - \frac{(ku)^2}{2}][1 - \frac{(kv)^2}{2}]\} [kd - \frac{(kd)^3}{6}] \frac{1}{r} dzdt$$

$$= \alpha \frac{k}{A_1} \int_{t_0}^{t_1} \int_{z_0}^{z_1} \{[uvk^2 - \frac{uv^3 + u^3v}{6} k^4 + \frac{u^3v^3}{36} k^6] \cos\phi_1$$

$$-[1 - \frac{u^2+v^2}{2} k^2 + \frac{u^2v^2}{4} k^4]\} [kd - \frac{(kd)^3}{6}] \frac{1}{r} dzdt$$

Fig.6

Fig.7
$$\begin{cases} = \alpha \frac{1}{A_1} \int_{t_0}^{t_1} \int_{z_0}^{z_1} \{[uvdk^4 - (\frac{uv^3+u^3v}{6} d + \frac{uvd^3}{6})k^6 \\ + (\frac{u^3v^3}{36} d + \frac{(uv^3+u^3v)d^3}{36})k^8 - \frac{u^3v^3d^3}{216} k^{10}]\cos\phi_1 \\ -dk^2 + (\frac{u^2+v^2}{2} d + \frac{d^3}{6})k^4 - (\frac{u^2v^2}{4} d + \frac{u^2+v^2}{12} d^3)k^6 \\ + \frac{u^2v^2}{24} d^3k^8]\} \frac{1}{r} dzdt \end{cases}$$

$$I_1 = \alpha \frac{k}{A_1} \int_{t_0}^{t_1} \int_{z_0}^{z_1} [\sin ku \, \sin kw \, \cos\phi_1 + \cos ku \, \cos kw] \frac{\cos kd}{r} dzdt$$

$$= \alpha \frac{k}{A_1} \int_{t_0}^{t_1} \int_{z_0}^{z_1} \{[[ku - \frac{(ku)^3}{6}][kw - \frac{(kw)^3}{6}]] \cos\phi_1$$

$$-[1 - \frac{(ku)^2}{2}][1 - \frac{(kw)^2}{2}]\}[1 - \frac{(kd)^2}{2}] \frac{1}{r} dzdt$$

$$= \alpha \frac{k}{A_1} \int_{t_0}^{t_1} \int_{z_0}^{z_1} \{[uwk^2 - \frac{uw^3 + u^3w}{6} k^4 + \frac{u^3w^3}{36} k^6] \cos\phi_1$$

$$-1 + \frac{u^2 + w^2}{2} k^2 - \frac{u^2w^2}{4} k^4\}[1 - \frac{(kd)^2}{2}] \frac{1}{r} dzdt$$

Fig.8

$$\text{Fig.9} \begin{cases} = \dfrac{\alpha}{A_1} \int_{t_0}^{t_1}\int_{z_0}^{z_1} \left\{\left[uwk^3 - \left(\dfrac{uw^3+u^3w}{6} + \dfrac{uwd^2}{2}\right)k^5 \right.\right. \\ \left. + \left(\dfrac{u^3w^3}{36} + \dfrac{uw^3+u^3w}{12}d^2\right)k^7 - \dfrac{u^3w^3}{72}d^2k^9\right]\cos\phi_1 \\ -k + \left(\dfrac{u^2+w^2}{2} + \dfrac{d^2}{2}\right)k^3 - \left(\dfrac{u^2w^2}{4} + \dfrac{u^2+w^2}{4}d^2\right)k^5 \\ \left. + \dfrac{u^2w^2}{8}d^2k^7\right\} \dfrac{1}{r}\,dzdt \end{cases}$$

Fig.11A
$$\begin{cases} \text{UNIT VECTOR:} \\ \text{MONOPOLE} <1> (s_x, s_y, s_z) = (0, 0, 1) \\ \text{MONOPOLE} <3> (t_x, t_y, t_z) = (\sin\phi_1, 0, \cos\phi_1) \\ \text{MONOPOLE} <4> \quad (\sin\phi_2, 0, \cos\phi_2) \\ \rho \text{ DIRECTION} (v_x, v_y, v_z) = (x/\rho, h/\rho, 0) \\ \phi \text{ DIRECTION} (w_x, w_y, w_z) = (-h/\rho, x/\rho, 0) \end{cases}$$

Fig.11B
$$\begin{cases} H\phi = \dfrac{1}{\mu} \nabla \times A = \dfrac{1}{\mu} \left( \dfrac{\partial A_\rho}{\partial z} - \dfrac{\partial A_z}{\partial \rho} \right) \\ \text{since } A_\rho = 0 \quad H\phi = -\dfrac{1}{\mu} \dfrac{\partial A_z}{\partial \rho} \end{cases}$$

Fig.11C
$$\begin{cases} B = -h \int_t^M M \dfrac{H\phi}{\rho} \sin\phi \, hdt \\ = \dfrac{h}{\mu} \int_t M \dfrac{1}{\rho} \dfrac{\partial A_z}{\partial \rho} \sin\phi \, hdt \end{cases}$$

$$\text{Fig.12} \begin{cases} A_z = \dfrac{\mu}{4\pi} \int_z J \dfrac{e^{-jkr}}{r} dz \\[6pt] \rho = (x^2+h^2)^{1/2} \\[6pt] r = \{\rho^2+(z-z')^2\}^{1/2} = (z^2+t^2-2zt\cos\phi+h^2)^{1/2} \\ \quad z': \text{z-COORDINATE OF MONOPOLES <3> AND <4>} \\[6pt] \dfrac{dr}{d\rho} = \dfrac{\rho}{r} \\[6pt] \dfrac{\partial A_z}{\partial \rho} = \dfrac{\mu}{4\pi} \int_z J \dfrac{\partial}{\partial \rho} \dfrac{e^{-jkr}}{r} dz \\[6pt] \quad = \int_z J \left(-jk \dfrac{\rho}{r^2} e^{-jkr} - \dfrac{\rho}{r^3} e^{-jkr}\right) dz \end{cases}$$

$$B = \frac{h}{4\pi} \iint_{t\,z} JM \frac{1}{\rho} \frac{\partial}{\partial \rho} \frac{e^{-jkr}}{r} \sin\phi\, dz\, dt$$

$$= \frac{h\sin\phi}{4\pi} \iint_{t\,z} JM\, [-\frac{jk}{r^2} - \frac{1}{r^3}] e^{-jkr} dz\, dt$$

Fig.13A $$B \cong \frac{h\sin\phi}{4\pi} e^{-jkr_0} \iint_{t\,z} JMJ[-\frac{jk}{r^2} - \frac{1}{r^3}]e^{-jk^d}dz\,dt$$

Fig.13B

Fig.14 
$$B_{13} = \frac{h_1 \sin\phi_1}{4\pi \sin kd_1 \sin kd_3} e^{-jkr_0} \int_t \int_z \sin k(z-z_0) \times$$
$$\sin k(t-t_0)\left[-\frac{jk}{r^2} - \frac{1}{r^3}\right] e^{-jkd} \, dz \, dt$$

$$B_{14} = \frac{h_2 \sin\phi_2}{4\pi \sin kd_1 \sin kd_4} e^{-jkr_0} \int_t \int_z \sin k(z-z_0) \times$$
$$\sin k(t_2-t)\left[-\frac{jk}{r^2} - \frac{1}{r^3}\right] e^{-jkd} \, dz \, dt$$

$$\int_t \int_z \sin ku \sin kv \left[-\frac{1}{r^3}\right] e^{-jkd} \, dz \, dt$$

$$= -\int_t \int_z [ku - \frac{(ku)^3}{6}][kv - \frac{(kv)^3}{6}] \times [\cos kd - j \sin kd] \frac{1}{r^3} \, dz \, dt$$

$$= -\int_t \int_z \{[ku - \frac{(ku)^3}{6}][kv - \frac{(kv)^3}{6}][1 - \frac{(kd)^2}{2}]$$

$$-j[ku - \frac{(ku)^3}{6}][kv - \frac{(kv)^3}{6}] \times [kd - \frac{(kd)^3}{6}]\} \frac{1}{r^3} \, dz \, dt$$

Fig.15

Fig.16
$$\begin{cases} = -\int_t \int_z \{uvk^2 - \frac{u^3v+uv^3+3uvd^2}{6} k^4 \\ + \frac{u^3v^3+3u^3vd^2+3uv^3d^2}{36} k^6 - \frac{u^3v^3d^2}{72} k^8 \\ -j[uvdk^3 - \frac{u^3vd+uv^3d+uvd^3}{6} k^5 \\ + \frac{u^3v^3d+u^3vd^3+uv^3d^3}{36} k^7 - \frac{u^3v^3d^3}{216} k^9]\} \frac{1}{r^3} dzdt \end{cases}$$

Fig.17
$$\begin{cases} \int_t \int_z \sin ku \sin kv [-\frac{jk}{r^2}] e^{-jkd} dzdt \\ = -\int_t \int_z \{uvk^2 - \frac{u^3v+uv^3+3uvd^2}{6} k^4 \\ + \frac{u^3v^3+3u^3vd^2+3uv^3d^2}{36} k^6 - \frac{u^3v^3d^2}{72} k^8 \\ -j[uvdk^3 - \frac{u^3vd+uv^3d+uvd^3}{6} k^5 \\ + \frac{u^3v^3d+u^3vd^3+uv^3d^3}{36} k^7 - \frac{u^3v^3d^3}{216} k^9]\} \frac{jk}{r^2} dzdt \end{cases}$$

$$\text{Fig.18} \begin{cases} = -\int_t \int_z \left\{ uvdk^4 - \frac{u^3vd+uv^3d+uvd^3}{6} k^6 \right. \\ \qquad + \frac{u^3v^3d+u^3vd^3+uv^3d^3}{36} k^8 - \frac{u^3v^3d^3}{216} k^{10} \\ \qquad + j\left[ uvk^3 - \frac{u^3v+uv^3+3uvd^2}{6} k^5 \right. \\ \qquad \left. \left. + \frac{u^3v^3+3u^3vd^2+3uv^3d^2}{36} k^7 - \frac{u^3v^3d^2}{72} k^9 \right] \right\} \frac{1}{r^2} dzdt \end{cases}$$

Fig.26

$$\begin{bmatrix} Z_{11}(\omega) & Z_{12}(\omega) & --- & Z_{1M}(\omega) \\ Z_{21}(\omega) & Z_{22}(\omega) & --- & Z_{2M}(\omega) \\ \vdots & \vdots & & \vdots \\ Z_{M1}(\omega) & Z_{M2}(\omega) & --- & Z_{MM}(\omega) \end{bmatrix} \begin{bmatrix} I_1(\omega) \\ \vdots \\ I_m(\omega) \\ \vdots \\ I_M(\omega) \end{bmatrix} = \begin{bmatrix} 0 \\ \vdots \\ V(\omega) \\ \vdots \\ 0 \end{bmatrix}$$

Fig. 31A  $I_p(Z_{pp}+R)+[I_{p1}Z_{pp1}+[I_{p2}Z_{pp2}+\sum_{n=1}^{M}[I_nZ_{pn}]=0$ Fig. 31B  $I_p = \dfrac{-1}{Z_{pp}+R}[[I_{p1}Z_{pp1}+[I_{p2}Z_{pp2}+\sum_{n=1}^{M}[I_nZ_{pn}]]$ Fig. 31C  $V_p = I_p R = \dfrac{-R}{Z_{pp}+R}[[I_{p1}Z_{pp1}+[I_{p2}Z_{pp2}+\sum_{n=1}^{M}[I_nZ_{pn}]]$ $$\left. \begin{array}{l} \int_0^L K(x)\sin\beta(x-L)dx = \sum_{n=1}^{N}[\sin\beta(x_n-L)]\sum_{m=1}^{M}(Z_{nm}-Z'_{nm})I_m \\ \int_0^L K(x)\cos\beta(x-L)dx = \sum_{n=1}^{N}[\cos\beta(x_n-L)]\sum_{m=1}^{M}(Z_{nm}-Z'_{nm})I_m \\ \int_0^h E_z^i(0,z)dz = \sum_{m=1}^{M}Z_{dm}I_m, \qquad \int_0^h E_z^i(L,z)dz = \sum_{m=1}^{M}Z_{rm}I_m \end{array} \right\}$$

Fig. 34

$$Id(\omega) = -j\frac{Zr}{D}\int_0^L K(x)\sin\beta(x-L)dx - j\frac{Z_o}{D\beta}\underbrace{\int_0^L \frac{d}{dx}K(x)\sin\beta(x-L)dx}_{\text{TERM A}}$$

$$+j\frac{Z_o}{D\beta}K(0)\sin\beta L - \frac{Z_o}{D}\int_0^h E_z^i(L,z)dz$$

$$+\frac{Z_o\cos\beta L + jZr\sin\beta L}{D}\int_0^h E_z^i(0,z)dz$$

Fig. 35

Fig. 36A $$A = \int_0^L \frac{d}{dx} K(x) \sin\beta(x-L) dx = K(0)\sin\beta L - \beta \int_0^L K(x)\cos\beta(x-L) dx$$

Fig. 36B $$\left\{ I_d(\omega) = -j \frac{Z_r}{D} \int_0^L K(x)\sin\beta(x-L) dx + j \frac{Z_o}{D} \int_0^L K(x)\cos\beta(x-L) dx \frac{Z_o\cos\beta L + jZ_r\sin\beta L}{D} \int_0^h E_{z'}(0,z) dz \right.$$

$$\left. - \frac{Z_o}{D} \int_0^h E_{z'}(L,z) dz + \right.$$

$$Ir(\omega) = \frac{Z_d\cos\beta L + jZ_o\sin\beta L}{D} \int_0^L K(x)\sin\beta(x-L)dx$$

$$-j\frac{Z_o\cos\beta L + jZ_d\sin\beta L}{D\beta} \int_0^L \frac{d}{dx} K(x)\sin\beta(x-L)dx$$

$$+j\frac{Z_o\cos\beta L + jZ_d\sin\beta L}{D\beta} K(0)\sin\beta L + \frac{Z_o}{D}\int_0^h Ez^i(0,z)dz$$

$$-\frac{Z_o\cos\beta L + jZ_d\sin\beta L}{D}\int_0^h Ez^i(L,z)dz$$

Fig. 37

$$Ir(\omega) = \frac{Zd\cos\beta L + jZo\sin\beta L}{D} \int_0^L K(x)\sin\beta(x-L)dx$$

$$+ j\frac{Zo\cos\beta L + jZd\sin\beta L}{D} \int_0^L K(x)\cos\beta(x-L)dx$$

$$+ \frac{Zo}{D}\int_0^h Ez^i(0,z)dz - \frac{Zo\cos\beta L + jZd\sin\beta L}{D}\int_0^h Ez^i(L,z)dz$$

$$\begin{bmatrix} Z^0c,c & Z^0c,d & B^0c,d \\ Z^0d,c & Z^0d,d + Z^dd,d & B^0d,d + B^dd,d \\ B^0d,c & B^0d,d - Y^0d,d & -Y^0d,d + B^dd,d + Y^dd,d \end{bmatrix} \begin{bmatrix} Ic,n \\ Id,n \\ Mn \end{bmatrix} = \begin{bmatrix} Vi \\ 0 \\ 0 \end{bmatrix}$$

⟨WAVE SOURCE INPUTS APPLIED TO MOMENT METHOD⟩

| | VOLTAGE | FREQUENCY |
|---|---|---|
| WAVE SOURCE 1 $V_c \sin \omega_c t$ | $V_c$ | $f_c$ |
| WAVE SOURCE 2 $\dfrac{mV_c}{2} \cos(\omega_c - \omega_m)t$ | $j\dfrac{mV_c}{2}$ | $f_c - 10^{-3}$ |
| WAVE SOURCE 3 $\dfrac{mV_c}{2} \cos(\omega_c + \omega_m)t$ | $-j\dfrac{mV_c}{2}$ | $f_c + 10^{-3}$ |

$\omega_c = 2\pi f_c$

Fig. 43

Fig.44A $\begin{cases} a_{m1}+jb_{m1}= I_{m1}\ \exp(j\ \phi_1) \\ \qquad \tan\phi_1=b_{m1}/a_{m1} \\ a_{m2}+jb_{m2}= I_{m2}\ \exp(j\ \phi_2) \\ \qquad \tan\phi_2=b_{m2}/a_{m2} \\ a_{m3}+jb_{m3}= I_{m3}\ \exp(j\ \phi_3) \\ \qquad \tan\phi_3=b_{m3}/a_{m3} \end{cases}$ Fig.44B $\begin{cases} I_{m1}\sin(\omega_c\ t+\phi_1) \\ I_{m2}\sin[(\omega_c-\omega_m)t+\phi_2] \\ I_{m3}\sin[(\omega_c+\omega_m)t+\phi_3] \end{cases}$

SIMULATION APPARATUS AND SIMULATION METHOD FOR ELECTROMAGNETIC FIELD INTENSITY USING MOMENT METHOD

BACKGROUND OF THE INVENTION

1. Field of the Invention

The present invention relates to a simulation apparatus and a simulation method for simulating the intensity of an electromagnetic field etc. radiated from an electronic apparatus by using the moment method; more particularly, it relates to a simulation apparatus and a simulation method using the moment method with which the intensity of an electromagnetic field etc., of time domain can be simulated at a high speed.

Electronic apparatuses are restricted by society from radiating more than a certain level of undesired radio waves or noise. Countries are establishing tough regulations in this regard.

In order to satisfy such radio wave regulations, use is made of various countermeasures such as shielding technology and filtering technology etc. When adopting these countermeasures, it is necessary to develop simulation technology to enable simulation of the degree of reduction of the radio waves or noise in a quantitative manner.

Electronic apparatuses are also restricted by society from being affected by radio waves or noise radiated from other electronic apparatuses, which level is more than a certain level. Countries are also establishing tough regulations in this regard.

2. Description of the Related Art

So as to satisfy these radio wave regulations, it is necessary to develop simulation technology enabling analysis of the reasons why electronic apparatuses radiate undesired radio waves or noise and why electronic apparatuses malfunction due to radio waves or noise.

In order to develop the latter simulation technology, an electromagnetic field intensity calculation apparatus which can simulate the intensity of the electromagnetic field which changes in time becomes necessary. However, this type of electromagnetic field intensity calculation apparatus for simulating the intensity of the electromagnetic field which changes in time has not yet been put into practical use. The reason for this will be explained below.

The intensity of the electromagnetic field radiated from any shape of object can be easily calculated by using known theoretical equations if the current (electric current) and magnetic current flowing in each part of the object are known. These current and magnetic current can be theoretically obtained by solving Maxwell's electromagnetic equations under given boundary conditions.

As the method of solving this, there is the moment method. The moment method is one of the methods of solving integration equations derived from Maxwell's electromagnetic equations and the method calculates the current and magnetic current by dividing an object into small elements and therefore is able to handle any three-dimensionally shaped object. As a reference on the moment method, there is "H. N. Wang, J. H. Richmond, and M. C. Gilreath: "Sinusoidal reaction formulation for radiation and scattering from conducting surface", IEEE TRANSACTIONS ANTENNAS PROPAGATION. vol. AP-23, 1975".

On the other hand, to solve why an electronic apparatus radiates undesired radio wave or noise and why an electronic apparatus malfunctions due to a radio wave or noise, analysis by the time domain is necessary. This is because what most causes malfunctions of electronic apparatuses is pulse-like noise. Further, malfunctions of electronic apparatuses are frequently caused by abnormal operation of devices contained in the apparatus, such as ICs. It is necessary to observe these devices over time so as to confirm their abnormal operation.

Two useful methods for time domain analysis are the finite element method and finite difference method. Although time domain analysis is possible with the finite element method and finite difference method, it is difficult to deal with electronic apparatuses comprising a variety of structures such as transmission lines, cables, and housings.

This is because, in the finite element method and finite difference method, it is necessary to perform segmentation of the analyzed object and the three-dimensional space surrounding it. When performing fine segmentation for small parts such as the cable terminating portions, since the space surrounding the housing and cables is huge, the number of segmentations becomes enormous and ends up overload in capacity of internal memories of the computer. Conversely, when rough segmentation is performed for the cables, housing, and other structures, it becomes impossible to analyze the effect of the cable terminating portions which play an important role in the mechanism and also become large sources of undesired radio wave or noise.

Further, in the finite element method and finite difference method, the coordinate system used for the segmentation is generally the orthogonal coordinate system. However, the cable and cable terminating portions, which play an important role in mechanism, are comprised of cylindrical elements, while the housing of the apparatus may be of any shape. Due to this, there exists a difficult question of how to segment the analyzed object.

In this regard, the moment method is free from all such problems and is well suited for dealing with electronic apparatuses comprising a variety of structures such as transmission lines, cables, and housings.

This is because the moment method is a type of boundary element method and requires that only the boundary surface be segmented two-dimensionally. Further, the segmentation pitch can be determined considerably freely, so the small parts can be finely segmented and the cables and the housing can be roughly segmented, so a number of segmentations much smaller than with the finite element method and finite difference method is sufficient. Further, since any shape of segmentation can be used, the problem of how to perform the segmentation does not exist.

Therefore, it can be considered that a noise current, noise voltage and radiation intensities of electromagnetic field which change in time are simulated by using the moment method. Namely, when the wave source which changes in time is given, it can be considered to adopt a method in which, the wave source is transformed to the frequency domain, the radiation intensities of the electromagnetic field are simulated in the transformed frequency domain, and the simulated values are inversely transformed to the time domain.

However, this method also cannot be realized with the related art. This is because the moment method works, when the frequency is given, by calculating a mutual impedance, mutual admittance, and mutual reaction among mesh-like elements and using the calculated values, to solve simultaneous equations, but the time for calculation itself of the mutual impedance etc. is long and, at the same time, when transformed from the time domain to the frequency domain, a considerably large number of frequencies is required. Since it is necessary to calculate the mutual impedance etc. at respective frequencies, an enormous amount of processing time becomes necessary.

Namely, when calculating the intensity of radiation of an electromagnetic field by using the moment method, as will be explained later referring to the drawings, a very long time is taken for the calculation of each of the mutual impedance, mutual admittance, and mutual reaction. In addition, since the computation must be carried out at respective frequencies of the frequency domain, this computation cannot be done in a practical time.

More concretely speaking, the time taken to solve the simultaneous equations under the moment method is on the order of a few minutes in the case of a single frequency, but the time taken for computing the mutual impedance, mutual admittance, and mutual reaction becomes on the order of a few hours. Since the mutual impedance and so on must be computed at respective frequencies of the frequency domain, the calculation cannot be finished within a practical time frame.

Note that the mutual impedance shows the relationship between the electric field induced by current flowing in one element and the current flowing in another element. The mutual admittance shows the relationship between a magnetic field induced by a magnetic current passing through one element and the magnetic current passing through another element. The mutual reaction shows the relationship between the magnetic field (electric field) induced by a current (magnetic current) applied to one element and the magnetic current (current) applied to another element. A current flows through metal, while a current and magnetic current flow on the surface of a dielectric body.

As seen from the above explanation, at the present time, no practical electromagnetic field intensity calculation apparatus able to simulate the intensity of an electromagnetic field which changes in time has yet been developed which can analyze apparatuses including printed board, cables, and housings.

SUMMARY OF THE INVENTION

Therefore, the present invention was made in consideration with such a circumstance and has as an object thereof to provide a simulation apparatus and a simulation method using a new moment method able to simulate the intensity of an electromagnetic field etc. which changes in time at a high speed.

To attain the above object, the present invention provides a simulation apparatus using a moment method which can simulate the intensity of an electromagnetic field, etc. of the time domain at a high speed constituted by a transforming means for obtaining a frequency spectrum by segmenting time series data of a wave source and applying Fourier transform; a calculating means for calculating the mutual impedance at a sampling frequency, generating an approximate expression of the mutual impedance from the calculated mutual impedance and the sampling frequency, and calculating the mutual impedances at respective frequencies obtained by the transforming means using the generated approximate expression; a simulating means for finding a current spectrum flowing in each element according to the moment method from the mutual impedance calculated by the calculating means and the frequency spectrum obtained by the transforming means and finding the spectrum of a voltage, an electric field, and a magnetic field from the found current spectrum; and an inverse transforming means for applying inverse Fourier transform to the spectra found by the simulating means and outputting the result.

BRIEF DESCRIPTION OF THE DRAWINGS

The above object and features of the present invention will be more apparent from the following description of the preferred embodiments with reference to the accompanying drawings, wherein:

FIGS. 4A and 4B are second explanatory views of generation of the approximate expression;

FIGS. 5A and 5B are third explanatory views of generation of the approximate expression;

FIG. 6 is a fourth explanatory view of generation of the approximate expression;

FIG. 7 is a fifth explanatory view of generation of the approximate expression;

FIG. 8 is a sixth explanatory view of generation of the approximate expression;

FIG. 9 is a seventh explanatory view of generation of the approximate expression;

FIGS. 11A, 11B and 11C are ninth explanatory views of generation of the approximate expression;

FIG. 12 is a 10th explanatory view of generation of the approximate expression;

FIGS. 13A and 13B are 11th explanatory views of generation of the approximate expression;

FIG. 14 is a 12th explanatory view of generation of the approximate expression;

FIG. 15 is a 13th explanatory view of generation of the approximate expression;

FIG. 16 is a 14th explanatory view of generation of the approximate expression;

FIG. 17 is a 15th explanatory view of generation of the approximate expression;

FIG. 18 is a 16th explanatory view of generation of the approximate expression;

FIG. 26 is an explanatory view of the simultaneous equations under the moment method;

FIGS. 31A, 31B, and 31C are second explanatory views of the derivation of the voltage between conductors;

FIG. 34 is a third explanatory view of the processing for calculating the coupling of transmission line;

FIG. 35 is a fourth explanatory view of the processing for calculating the coupling of transmission line;

FIGS. 36A and 36B are fifth explanatory views of the processing for calculating the coupling of transmission line;

FIG. 37 is a sixth explanatory view of the processing for calculating the coupling of transmission line;

FIG. 38 is a seventh explanatory view of the processing for calculating the coupling of transmission line;

FIG. 41 is an explanatory view of simultaneous equations under the moment method;

FIG. 43 is a second explanatory view of analysis of radiation of an antenna;

FIGS. 44A and 44B are third explanatory views of analysis of radiation of an antenna.

DESCRIPTION OF THE PREFERRED EMBODIMENTS

Before describing the embodiments of the present invention, the related art and the disadvantages therein will be described with reference to the related figures.

Figure 45:
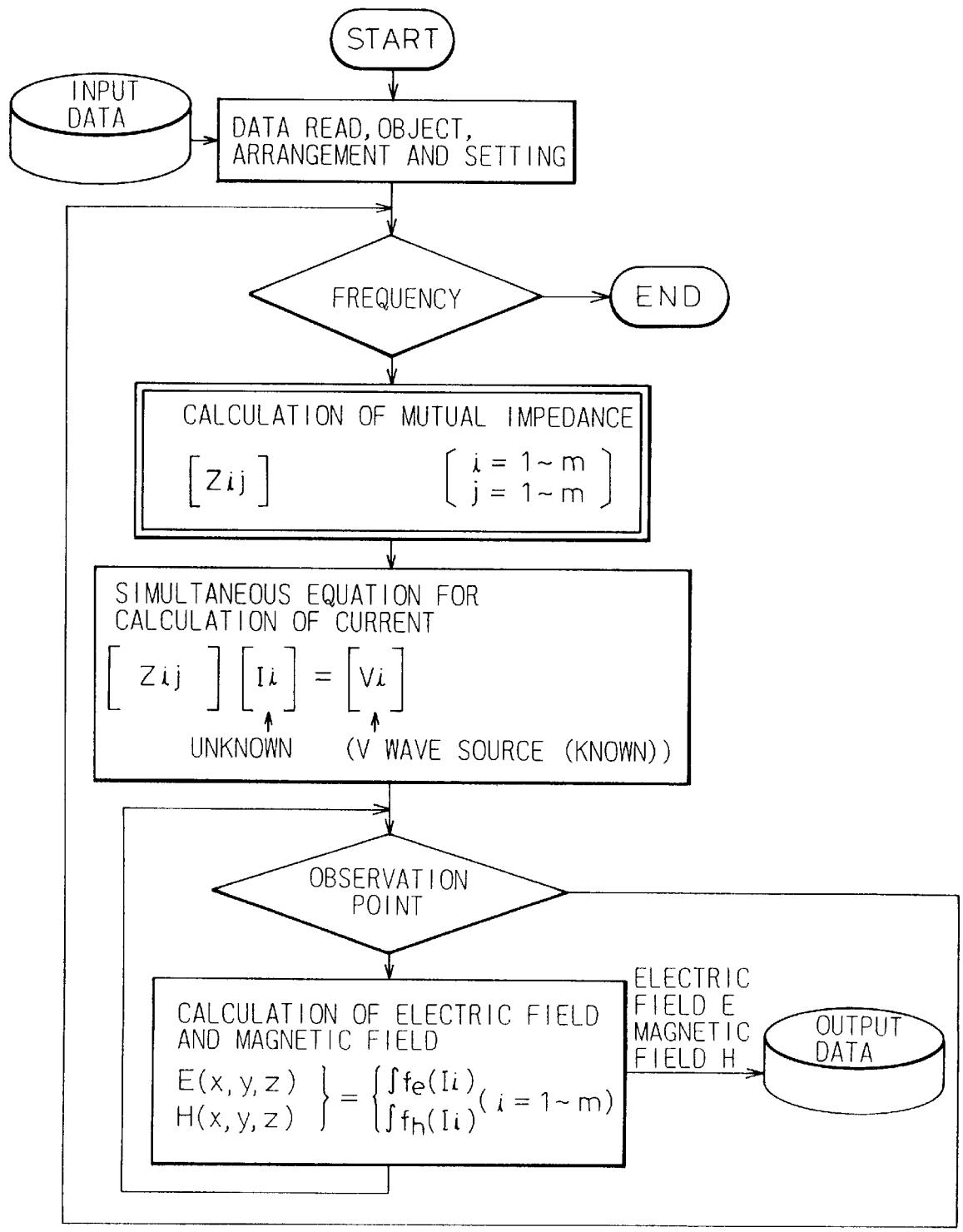
FIG. 45 is an explanatory view of the moment method.

FIG. 45 is a view for explaining the known moment method.

When calculating the intensity of radiation of an electromagnetic field by the moment method, as shown in the flow of processing of FIG. 45, when reading configuration information of the mesh-like electronic apparatus to be simulated, one still unprocessed frequency is selected from among the frequencies to be computed for and the mutual impedance, mutual admittance, and mutual reaction among the mesh-like elements are sought for that frequency by a predetermined computation. The found mutual impedance etc. and the wave source specified by the configuration information are substituted in the simultaneous equations under the moment method and the current and magnetic current flowing in each element are found by solving them. These are then used to calculate the intensity of radiation of the electromagnetic field at every observation point. However, calculation of each of the mutual impedance, mutual admittance, and mutual reaction takes a very long time, and, in addition, they must be computed for each frequency in the frequency domain. As already mentioned, this calculation cannot be done in a short time practical.

Namely, as mentioned before, the time taken to solve the simultaneous equations under the moment method is on the order of a few minutes in the case of a single frequency, but the time taken for computing the mutual impedance, mutual admittance, and mutual reaction becomes on the order of a few hours. Since these must be computed for each frequency of the frequency domain, the calculation cannot be finished within a short time practical.

The present invention enables high speed simulation of the intensity of an electromagnetic field and the like which is changeable in time. The invention will be explained in detail below. Note that, in the calculation of the intensity of radiation of an electromagnetic field by using the moment method as in the present invention, preferably use is made of the technique for high speed processing of the moment method which has been previously devised by the present inventors (Japanese Patent Application No. 7-298062). Therefore, an explanation will be made first of the high speed processing of the moment method devised by the present inventors.

In the high speed processing of the moment method, attention is paid to the fact that, where the frequency is represented by f, the wave number is represented by k (=2πf/c, where c is the speed of light), and the primitive distance between elements is represented by $r_0$, the mutual impedance $Z_{ij}$ between an element i and an element j divided under the moment method can be approximated by a polynomial which is expressed in terms of power exponents of the frequency as follows:

$$Z_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

the mutual admittance $Y_{ij}$ can be approximated by a polynomial of power exponents which is expressed in terms of the frequency as follows:

$$Y_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

and the mutual reaction $B_{ij}$ can be approximated by a polynomial of power exponents which is expressed in terms of the frequency as follows:

$$B_{ij}=e^{-jkr_0}[(a_0+a_1f^2+a_2f^4+a_3f^6+a_4f^8+\cdots)+j(b_0f+b_1f^3+b_2f^5+b_3f^7+b_4f^9+\ldots)]$$

Then, first of all, the mutual impedance $Z_{ij}$, the mutual admittance $Y_{ij}$ and the mutual reaction $B_{ij}$ are computed at several sampling frequencies according to an accurate computation method. The resultant values are substituted in the above approximate expressions to generate the simultaneous equations for finding the coefficients $a_p$ and $b_p$ with respect to each of the further resultant values and then these equations are solved to find the coefficients $a_p$ and $b_p$. After this, when a frequency other than the sampling frequency is given, the mutual impedance $Z_{ij}$, the mutual admittance $Y_{ij}$, and the mutual reaction $B_{ij}$ are respectively computed by using the above approximate expressions specified by the coefficients $a_p$ and $b_p$. This enables realization of high speed processing of the moment method.

Note that the number of the sampling frequencies is determined by how far the coefficients $a_p$ and $b_p$ are to be sought. For example, when the number of sampling frequencies is five, the coefficients $a_p$ and $b_p$ up to "$a_0$ to $a_4$, $b_0$ to $b_4$" are found.

As will be explained immediately hereafter, the present invention uses a method in which, when a wave source is given which change along with time, this wave source is transformed to the frequency domain, the moment method is used to simulate the current or voltage of the elements and the intensity of radiation of the electromagnetic field in the transformed frequency domain, and then the simulated values are inversely transformed to the time domain. At this time, if the high speed processing for the moment method mentioned above is used, the mutual impedance $Z_{ij}$, the mutual admittance $Y_{ij}$, and the mutual reaction $B_{ij}$ can be calculated at an extremely high speed, therefore it becomes possible to perform the moment method at a further high speed.

Due to this, it becomes possible to analyze in a short time why an electronic apparatus radiates an undesired radio wave or noise and why an electronic apparatus malfunctions due to radio wave or noise.

Figure 1:
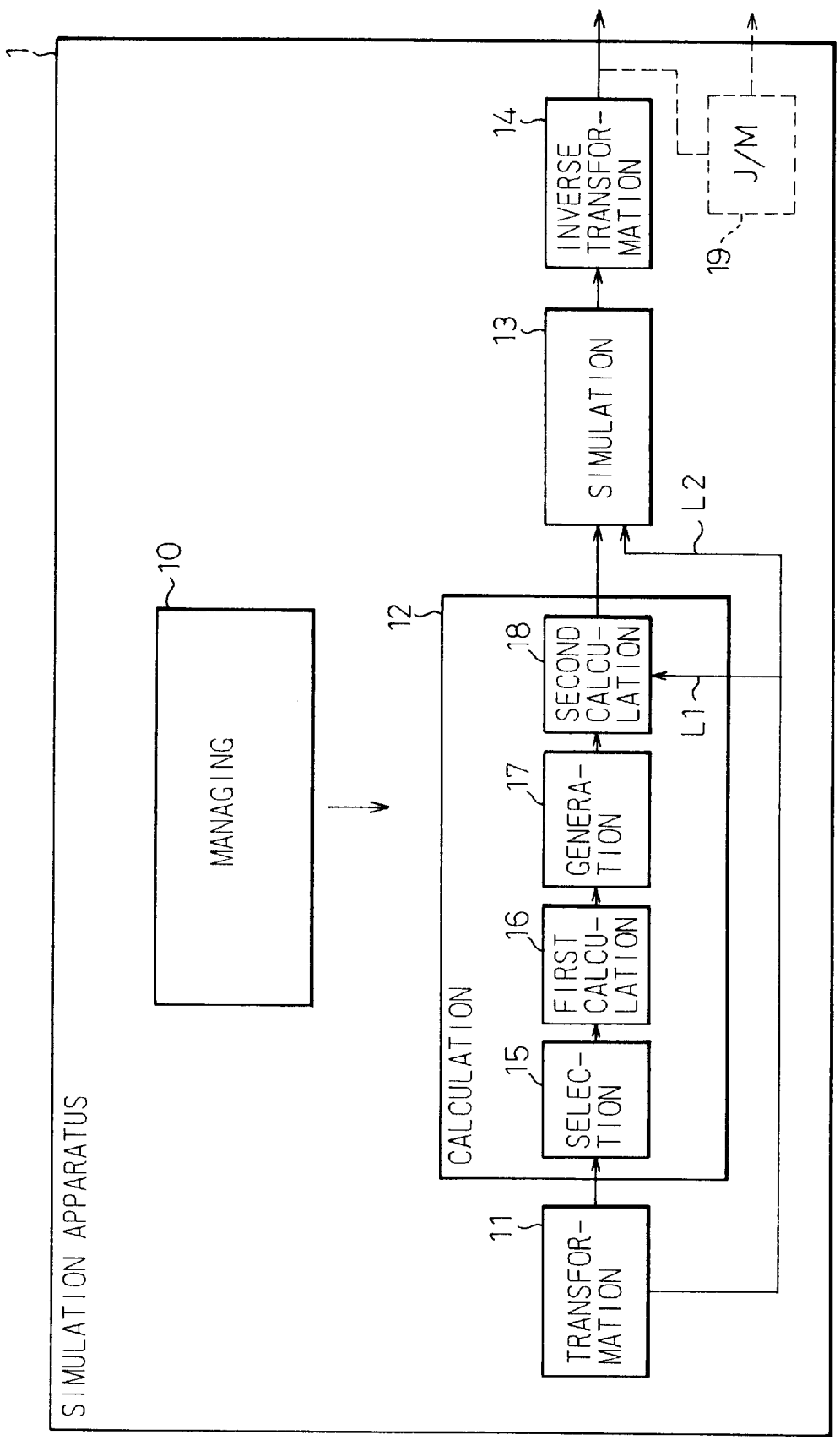
FIG. 1 is a view of the principle and configuration of the present invention.
Figure 2:
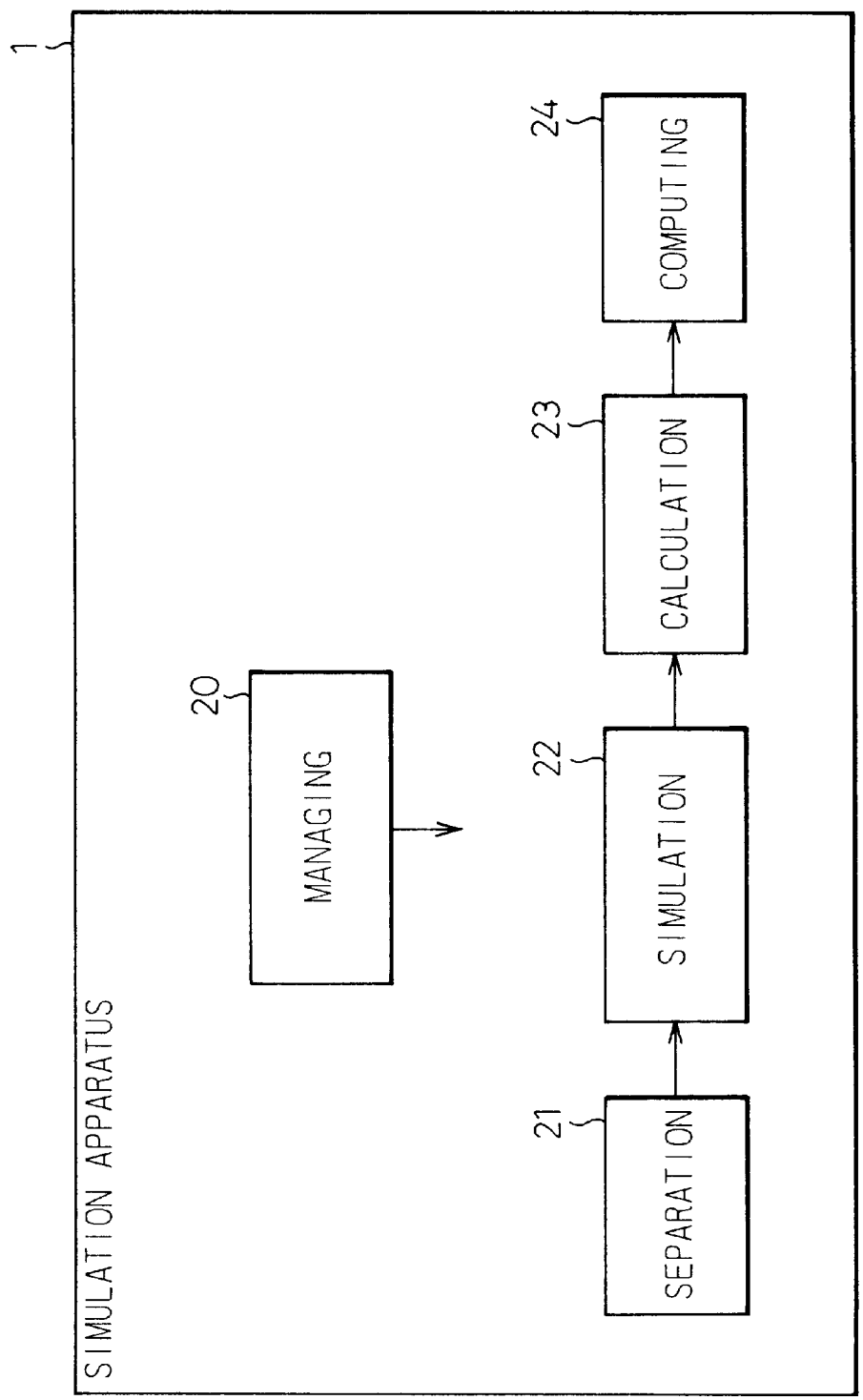
FIG. 2 is another view of the principle and configuration of the present invention.

The principle and configuration of the present invention are illustrated in FIG. 1 and FIG. 2.

In the figures, 1 is a simulation apparatus provided by the present invention. This apparatus divides an electronic apparatus into elements, calculates the mutual impedance, the mutual admittance, and the mutual reaction among the elements when a frequency is given, and simulates the current and magnetic current flowing in each element according to the moment method from the calculated values and the wave sources corresponding to the elements.

The simulation apparatus 1 of the present invention illustrated in FIG. 1 is provided with a managing means 10, a transforming means 11, a calculating means 12, a simulating means 13, and an inverse transforming means 14.

This managing means 10 manages the configuration information of the electronic apparatus which has been divided into elements to be simulated. The transforming means 11 segments the time series data of the wave source and applies Fourier transform to obtain the frequency spectrum. All or a part of the frequency spectrum and the frequency defining each frequency spectrum are set as the object of processing by the transforming means 11.

The calculating means 12 is provided with a selecting means 15 for selecting a sampling frequency by taking the frequency set by the transforming means 11 into account, a first calculating means 16 for calculating the mutual impedance, mutual admittance, and mutual reaction at the sampling frequency selected by the selecting means 15, a generating means 17 for generating an approximate expression of the mutual impedance from the sampling frequency and the mutual impedance calculated by the first calculating means 16, generating an approximate expression of the mutual admittance from the sampling frequency and the mutual admittance calculated by the first calculating means 16, and generating an approximate expression of the mutual reaction from the sampling frequency and the mutual reaction calculated by the first calculating means 16, and a second calculating means 18 for calculating the mutual impedance, the mutual admittance, and the mutual reaction at frequencies set by the transforming means 11 by using the approximate expressions generated by the generating means 17.

The simulating means 13 finds the current spectrum and magnetic current spectrum flowing through the elements according to the moment method from the mutual impedance, mutual admittance, and mutual reaction calculated by the calculating means 12 and the frequency spectrum set by the transforming means 11 and, at the same time, find the voltage spectrum, electric field spectrum, and magnetic field spectrum from the current spectrum and magnetic current spectrum if desired and sets the desired frequency in the found spectrum as the object for output. The inverse transforming means 14 transforms the spectrum to be output set by the simulating means 13 to the time domain by applying inverse Fourier transform and outputs the result.

Here, the simulating means 13 sometimes performs the processing only to find the current spectrum and the magnetic current spectrum according to the request of an operator. At this time, the J/M means 19 of FIG. 1 will directly find the voltage, electric field, and magnetic field of the time domain from the current and magnetic current of the time domain output by the inverse transforming means 14.

In the simulation apparatus 1 of the present invention, when the transforming means 11 obtains the frequency spectrum by segmenting the time series data of the wave source and applying Fourier transform, and all or a part of the frequency spectrum and the frequency defining the frequency spectrum are set as the object of the processing by that means 11, the selecting means 15 selects a sampling frequency by taking the frequency set by the transforming means 11 into account, and the first calculating means 16 calculates the mutual impedance, mutual admittance, and mutual reaction at the sampling frequency selected by the selecting means 15 according to an accurate algorithm.

Then, the generating means 17 prepares the simultaneous equations using the coefficients $a_p$ and $b_p$ as the unknown numbers by approximating the mutual impedance $Z_{ij}$ as follows, for example:

$$Z_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j) and substituting the sampling frequency and the mutual impedance calculated by the first calculating means 16 in this approximate expression, and solves the equations.

Further, the generating means 17 prepares the simultaneous equations using the coefficients $a_p$ and $b_p$. as the unknown numbers by approximating the mutual admittance $Y_{ij}$ as follows, for example:

$$Y_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j), and substituting the sampling frequency and the mutual admittance calculated by the first calculating means 16 in this approximate expression, and solving the equations.

Further, the generating means 17 prepares the simultaneous equations using the coefficients $a_p$ and $b_p$ as the unknown numbers by approximating the mutual reaction $B_{ij}$ as follows, for example:

$$B_{ij}=e^{-jkr_0}[(a_0+a_1f^2+a_2f^4+a_3f^6+a_4f^8+\ldots)+j(b_0f+b_1f^3+b_2f^5+b_3f^7+b_4f^9+\ldots)]$$

(where f: frequency; k: wave number; $r_0$: distance between element i and element j), and substituting the sampling frequency and the mutual reaction calculated by the first calculating means 16 in this approximate expression, and solving the equations.

When the approximate expressions of the mutual impedance, mutual admittance, and mutual reaction are derived in this way, the second calculating means 18 calculates the mutual impedance, mutual admittance, and mutual reaction at each frequency (via L1) set by the transforming means 11 by using these approximate expressions. Upon receipt of this, the simulating means 13 finds the current spectrum and the magnetic current spectrum flowing in each element according to the moment method from these calculated mutual impedance, mutual admittance, and mutual reaction and the frequency spectrum (via L2) set by the transforming means 11.

Then, the simulating means 13 specifies the current spectrum for which the simulation is desired from the above found current spectrum and the magnetic current spectrum, finds the voltage spectrum, electric field spectrum, and magnetic field spectrum for which the simulation is desired, and sets the spectrums as the object of output. The inverse transforming means 14 transforms the set spectrums to the time domain by applying inverse Fourier transform and outputs the results.

In this way, in the simulation apparatus 1 of the present invention illustrated in FIG. 1, a configuration is adopted for calculating the mutual impedance, the mutual admittance, and the mutual reaction at an extremely high speed by using approximate expressions. Therefore, it becomes possible to adopt a method in which, when wave source changing in time is given, the changing wave source is transformed to the frequency domain, and the electromagnetic field intensity etc. are simulated in the transformed frequency domain, and the simulated values are inversely transformed to the time domain by using the moment method.

Due to this, by using the simulation apparatus 1 of this present invention, it becomes possible to simulate the influence of a wave source on an electronic apparatus in the time domain. For this reason, it becomes possible to analyze why an electronic apparatus radiates an undesired radio wave or noise and why an electronic apparatus malfunctions due to radio wave or noise.

On the other hand, the simulation apparatus 1 of the present invention illustrated in FIG. 2 is provided with a managing means 20, a separating means 21, a simulating means 22, a calculating means 23, and a computing means 24.

This managing means 20 manages the configuration information of the electronic apparatus divided into elements. Where using as a wave source one which outputs a modulated carrier signal, the separating means 21 separates the wave source into three wave sources having different frequencies defined by the frequency of the carrier signal and the frequency of the modulated signal. The simulating means 22 simulates the current of the frequency domain and the magnetic current of the frequency domain flowing in each element. Note that, the frequency of the carrier signal is 30 MHz to 1 GHz according to the CISPR (International Special Committee on Radio Interference).

The calculating means 23 calculates the current of the time domain and the magnetic current of the time domain. The computing means 24, from the current of the time domain and the magnetic current of the time domain found by the calculating means 23, computes the current, voltage, electric field, and magnetic field of the time domain desired.

In the simulation apparatus 1 of the present invention illustrated in FIG. 2, where using as the wave source one modulating a carrier signal, the separating means 21 separates the wave source into three wave sources having different frequencies defined by the frequency of the carrier signal and the frequency of the modulated signal. Upon receipt of this, the simulating means 22 simulates the current of the frequency domain and the magnetic current of the frequency domain flowing in each element by applying the moment method to the wave sources separated by the separating means 21.

Upon receipt of the result of this simulation, the calculating means 23 calculates the current of the time domain from the current of the frequency domain found by the simulating means 22 and calculates the magnetic current of the time domain from the magnetic current of the frequency domain found by the simulating means 22. Then, the calculating means 24 calculates the current, voltage, electric field, and magnetic field of the time domain by combining the current of the time domain and magnetic current of the time domain found by the calculating means 23, finding the voltage etc. of the time domain by using the current of the time domain and magnetic current of the time domain after combination, or finding the voltage etc. of the time domain by using the current of the time domain and magnetic current of the time domain before combination and then combining them.

In a configuration, when the wave source is one which outputs a modulated carrier signal, obtaining the frequency spectrum by segmenting the time series data of a wave source and further applying Fourier transform according to the simulation apparatus 1 of the present invention illustrated in FIG. 1 in this way, the number of segmentations becomes extremely large. Therefore, the above method is not used for a wave source outputting a modulated carrier signal. Rather, the simulation apparatus 1 of the present invention illustrated in FIG. 2 is used. Thus, the current of the time domain and the magnetic current of the time domain flowing in each element can be easily sought according to the moment method.

Below, the present invention will be explained in further detail with reference to embodiments.

The present inventors devised a method by which the calculation of the electromagnetic field intensity according to the moment method can be performed at an extremely high speed as mentioned before.

In this method, there adopted a configuration in which the mutual impedance $Z_{ij}$ (current dipole-to-current dipole) between the element i and the element j is approximated as follows:

$$Z_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)];$$

the mutual admittance $Y_{ij}$ (magnetic current dipole-to-magnetic current dipole) between the element i and the element j is approximated as follows:

$$Y_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)];$$

and the mutual reaction $B_{ij}$ (current dipole-to-magnetic current dipole) between the element i and the element j is approximated as follows:

$$B_{ij}=e^{-jkr_0}[(a_0+a_1f^2+a_2f^4+a_3f^6+a_4f^8+\ldots)+j(b_0f+b_1f^3+b_2f^5+b_3f^7+b_4f^9+\ldots)]$$

Where f is a frequency; k is a wave number ($k=2\pi f/c$, where c is the speed of light); and $r_0$ is a primitive distance between elements.

Next, an explanation will be made of the fact that the mutual impedance $Z_{ij}$ can be approximated by such a polynomial in terms of the frequency.

Figure 3:
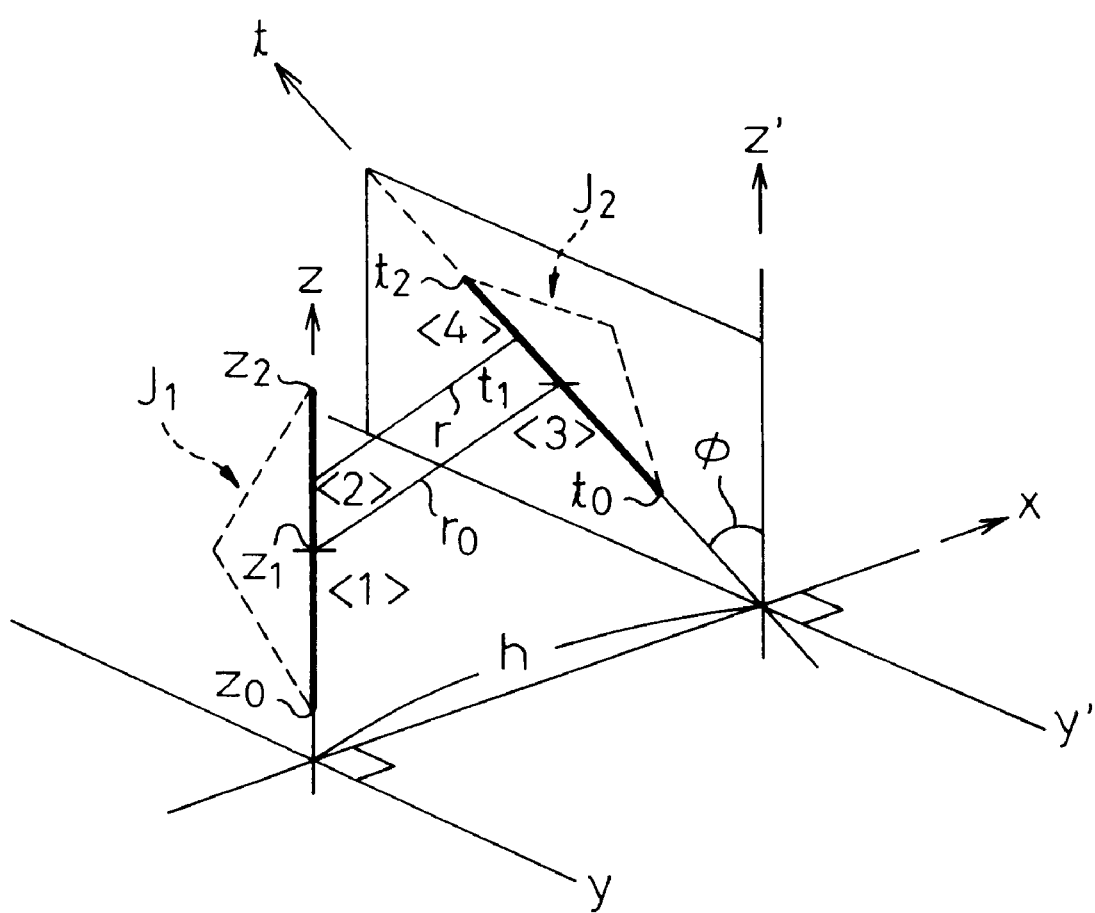
FIG. 3 is a first explanatory view of generation of an approximate expression.

For explaining the approximate expression of the mutual impedance $Z_{ij}$, a monopole as shown in FIG. 3 is considered. In the figure, the bold line indicates the monopole, and the dotted line indicates the shape of the expansion functions $J_1$ and $J_2$ as will be mentioned later. Here, the inclination between the monopole <1> and monopole <3> is defined as $\phi_1$, and the inclination between the monopole <1> and monopole <4> is defined as $\phi_2$. In the figure, $\phi_1$ and $\phi_2$ are represented by $\phi$.

The general equation of the mutual impedance $Z_{ij}$ is given by the equation illustrated in FIG. 4A. Here, $\omega$ is an angular frequency, r is a distance, $\rho_1 = -1/j\omega \times \partial J_1/\partial t$, $\rho_2 = -1/j\omega \times \partial J_2/\partial t$. Further, the reason why integration is carried out by using s is that consideration is given not only to the case where the shape of the monopole is linear (wire), but also a case where the shape of the monopole is planar (a surface patch).

$J_1$ and $J_2$ are the expansion functions in the moment method. The expansion functions show the shape of the current distribution on the monopole. The expansion functions differ depending upon the type of the moment method, but the following proof can be applied to all moment methods. Namely, as the expansion functions, any of a sinusoidal current, triangular current, or pulse function current can be used. Further, the following proof can be applied to any of the linear and planar shape as the shape of the monopole. The proof here is carried out by the "piecewise" sinusoidal moment method. Note that, in FIG. 3, for convenience, the expansion functions are shown by triangular shapes by the dotted lines, but the expansion functions in the following explanation are sinusoidal currents.

In the piecewise sinusoidal moment method, the expansion functions of the monopoles <1> to <4> of FIG. 3 can be represented as follows. Here, $d_1$ is the length of the monopole <1>, $d_2$ is the length of the monopole <2>, $d_3$ is the length of the monopole <3>, and $d_4$ is the length of the monopole <4>.

Electric current monopole <1> $J_1 = \sin k(z-z_0)/\sin kd_1$

Electric current monopole <2> $J_1 = \sin k(z_2-z)/\sin kd_2$

Electric current monopole <3> $J_2 = \sin k(t-t_0)/\sin kd_3$

Electric current monopole <4> $J_2 = \sin k(t_2-t)/\sin kd_4$

By using these expansion functions, first, the mutual impedance $Z_{13}$ between the monopole <1> and the monopole <3> and the mutual impedance $Z_{14}$ between the monopole <1> and the monopole <4> are found. These mutual impedances $Z_{13}$ and $Z_{14}$ are shown by the equations illustrated in FIG. 4B.

Here, when taking the fact that the distance between monopoles can be represented by $r = (z^2 + t^2 - 2zt\cos\phi + h^2)^{1/2}$ into account, the coefficients of these mutual impedances $Z_{13}$ and $Z_{14}$ are shown by the equations illustrated in FIG. 5A. Note that, $\alpha = c\mu/4\pi$ ($\alpha$ is constant).

Further, the distance r between monopoles can be approximated as follows if the distance between the end point of one monopole and the end point of the other monopole is represented by $r_0$:

$$r = [r_0^2 + (r^2 - r_0^2)]^{1/2} = (r_0^2 + \Delta)^{1/2} = r_0(1 + \Delta/r_0^2)^{1/2}$$
$$\approx r_0(1 + \Delta/2r_0^2 - \Delta^2/8r_0^4 + \ldots)$$
$$= r_0 + \Delta/2r_0 - \Delta^2/8r_0^3 + \ldots = r_0 + d$$
$$(\text{where } \Delta = (r^2 - r_0^2) \text{ and } d = \Delta/2r_0 - \Delta^2/8r_0^3 + \ldots$$
$$r_0 = (z_1^2 + t_1^2 - 2z_1 t_1 \cos\phi + h^2)^{1/2})$$

From this, the mutual impedances $Z_{13}$ and $Z_{14}$ are shown in the equations illustrated in FIG. 5B. Here, $A_1 = \sin kd_1 \cdot \sin kd_3$.

In order to express this equation in a simple format, $z-z_0 = u$, $t-t_0 = v$, and $w = -t + t_2$ are set. Further, if the polynomial approximation by using:

$$\sin ku \approx ku - (ku^3)/6 \quad \cos ku \approx 1 - (ku)^2/2$$

are carried out while assuming that the monopole is short, the real part $R_1$ of the mutual impedance $Z_{13}$ is converted as in the equation illustrated in FIG. 6 and finally shown by the equation illustrated in FIG. 7. Note that, the notation is omitted for $e^{-jkr0}$.

Here, when rewriting the coefficients for the terms of $k^4$ etc. to $P_1$ to $P_8$, this equation is represented as follows:

$$R_1 = (\alpha/A_1)[P_1 k^4 - P_2 k^6 + P_3 k^8 - P_4 k^{10})\cos\phi_1 - P_5 k^2 + P_6 k^4 - P_7 k^6 + P_8 k^8]$$

Further, if an approximate expression such as "$A_1 = \sin kd_1 \cdot \sin kd_3 \approx d_1 d_3 k^2$" is used, and $e^{-jkr0}$ for which the notation was previously omitted is entered, the real number part $R_1$ of the mutual impedance $Z_{13}$ is represented as follows:

$$R_1 = [\alpha e^{-jkr0}/(d_1 d_3 k^2)][(P_1 k^4 - P_2 k^6 + P_3 k^8 - P_4 k^{10})\cos\phi_1 - P_5 k^2 + P_6 k^4 - P_7 k^6 + P_8 k^8]$$
$$= [\alpha e^{-jkr0}/(d_1 d_3)][(P_1 k^2 - P_2 k^4 + P_3 k^6 - P_4 k^8)\cos\phi_1 - P_5 + P_6 k^2 - P_7 k^4 + P_8 k^6]$$

On the other hand, an imaginary part $I_1$ of the mutual impedance $Z_{13}$ is expressed as shown by the equation illustrated in FIG. 8. From this, it is finally expressed as shown by the equation illustrated in FIG. 9. Note that the notification has been omitted for $e^{-jkr0}$.

Here, when rewriting the coefficients of the terms of $k^3$ etc. to $Q_1$ to $Q_8$, this equation is represented as follows:

$$I_1 = (\alpha/A_1)[Q_1 k^3 - Q_2 k^5 + Q_3 k^7 - Q_4 k^9)\cos\phi_1 - Q_5 k + Q_6 k^3 - Q_7 k^5 + Q_8 k^7]$$

Further, if an approximate expression such as "$A_1 = \sin kd_1 \cdot \sin kd_2 \approx d_1 d_2 k^2$" is used and $e^{-jkr0}$ for which the notation was previously omitted is entered, the imaginary part $I_1$ of the mutual impedance $Z_{13}$ is represented as follows:

$$I_1 = [\alpha e^{-jkr0}/(d_1 d_2 k^2)][(Q_1 k^3 - Q_2 k^5 + Q_3 k^7 - Q_4 k^9)\cos\phi_1 - Q_5 k + Q_6 k^3 - Q_7 k^5 + Q_8 k^7]$$
$$= [\alpha e^{-jkr0}/(d_1 d_3)][(Q_1 k - Q_2 k^3 + Q_3 k^5 - Q_4 k^7)\cos\phi_1 - Q_5/k + Q_6 k - Q_7 k^3 + Q_8 k^5]$$

From this, the mutual impedance $Z_{13}$ is represented as follows:

$$Z_{13} = R_1 + jI_1$$
$$= [\alpha e^{-jkr0}/(d_1 d_3)][(P_1 k^2 - P_2 k^4 + P_3 k^6 - P_4 k^8)\cos\phi_1 - P_5 + P_6 k^2 - P_7 k^4 + P_8 k^6] + j[\alpha e^{-jkr0}/(d_1 d_3)][(Q_1 k - Q_2 k^3 + Q_3 k^5 - Q_4 k^7)\cos\phi_1 - Q_5/k + Q_6 k - Q_7 k^3 + Q_8 k^5]$$

Also the mutual impedance $Z_{14}$ can be similarly found. The mutual impedance $Z_{14}$ is indicated below. When rewriting the coefficients of the terms of $k^3$ etc. to $R_1$ to $R_8$, this equation is represented as follows:

$$Z_{14} = [\alpha e^{-jkr0}/(d_1 d_4)][(R_1 k^2 - R_2 k^4 + R_3 k^6 - R_4 k^8)\cos\phi_2 + R_5 - R_6 k^2 + R_7 k^4 - R_8 k^6] + j[\alpha e^{-jkr0}/(d_1 d_4)][(S_1 k - S_2 k^3 + S_3 k^5 - S_4 k^7)\cos\phi_2 + S_5/k - S_6 k + S_7 k^3 - S_8 k^5]$$

In this way, the mutual impedance $(Z_{13} + Z_{14})$ can be represented by the polynomial of the wave number k as shown in the following. When rewriting the coefficients of the terms of $k^3$ etc. to $C_1$ to $C_9$, the result becomes as follows:

$$Z_{13} + Z_{14} = e^{-jkr0}[(C_0 + C_1 k^2 + C_2 k^4 + C_3 k^6 + C_4 k^8 + \ldots) + j(C_5 k^{-1} + C_6 k + C_7 k^3 + C_8 k^5 + C_9 k^7 + \ldots)]$$

If the mutual impedance between the monopole <2> and the monopole <3> is represented by $Z_{23}$ and the mutual impedance between the monopole <2> and the monopole <4> is represented by $Z_{24}$, the mutual impedance $(Z_{23}+Z_{24})$ can be similarly found, therefore also the mutual impedance $(Z_{13}+Z_{14}+Z_{23}+Z_{24})$ can be represented by a polynomial of the wave number k similar to the above equation.

Namely, the mutual impedance $Z_{ij}$ can be approximated as follows:

$$Z_{ij}=e^{-jkr0}[(a_0+a_1k^2+a_2k^4+a_3k^6+a_4k^8+\ldots)+j(b_0k^{-1}+b_1k+b_2k^3+b_3k^5+b_4k^7+\ldots)]$$

It can be proved that the mutual admittance $Y_{ij}$ can be approximated by a polynomial of frequency similar to the mutual impedance $Z_{ij}$ mentioned above. Also, the approximate expression thereof is exactly the same as the approximate expression of the mutual impedance $Z_{ij}$. Therefore the proof will be omitted.

Namely, the mutual admittance $Y_{ij}$ can be approximated as follows:

$$Y_{ij}=e^{-jkr0}[(a_0+a_1k^2+a_2k^4+a_3k^6+a_4k^8+\ldots)+j(b_0k^{-1}+b_1k+b_2k^3+b_3k^5+b_4k^7+\ldots)]$$

Next, an explanation will be made of the fact that the mutual reaction $B^{ij}$ can be approximated by a polynomial of frequency.

Figure 10:
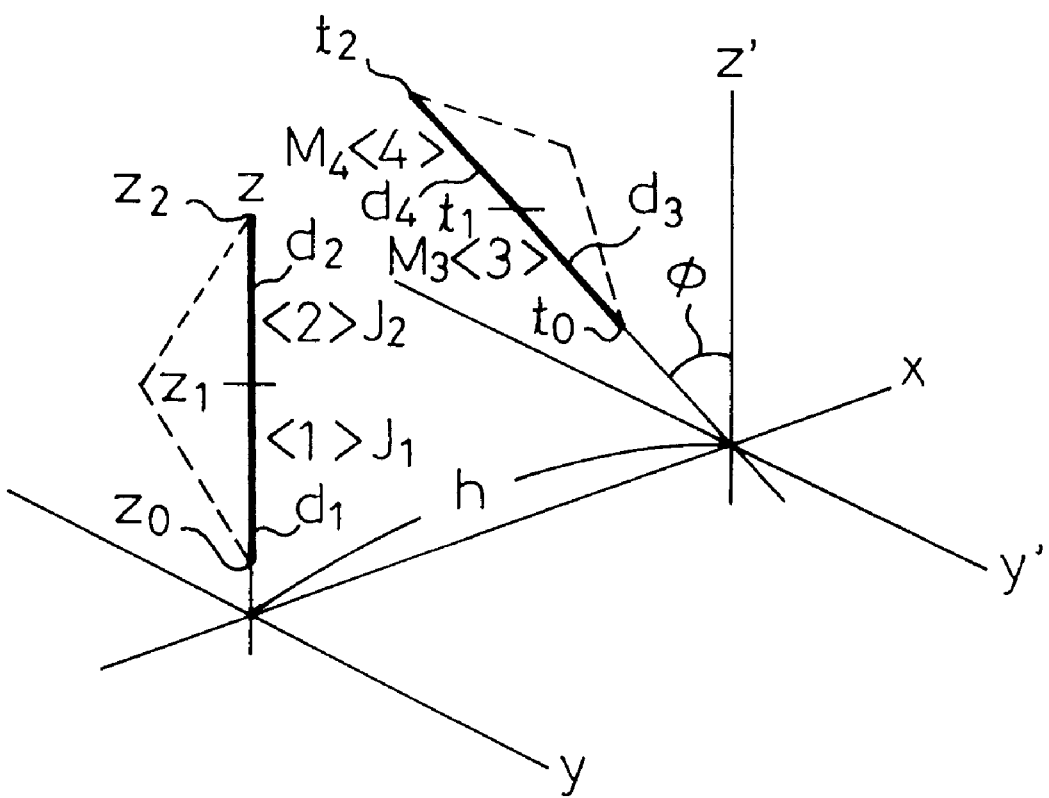
FIG. 10 is an eighth explanatory view of generation of the approximate expression.

For explaining the approximate expression of the mutual reaction $B_{ij}$, the monopole as shown in FIG. 10 is considered. In the figure, the bold line indicates a monopole, and a dotted line indicates the shape of the expansion function, as in FIG. 3.

A magnetic field due to the current source will be considered. Here, the unit vector can be shown as illustrated in FIG. 11A.

In the piecewise sinusoidal moment method, the expansion functions of the monopoles <1> to <4> of FIG. 10 can be represented as follows. Here, $d_1$ is the length of the monopole <1>, $d_2$ is the length of the monopole <2>, $d_3$ is the length of the monopole <3>, and $d_4$ is the length of the monopole <4>.

Electric current monopole <1> $J_1=\sin k(z-z_0)/\sin kd_1$
Electric current monopole <2> $J_2=\sin k(z_2-z)/\sin kd_2$
Magnetic current monopole <3> $M_3=\sin k(t-t_0)/\sin kd_3$
Magnetic current monopole <4> $M_4=\sin k(t_2-t)/\sin kd_4$ Where the current source exists only on the z-coordinate, the electromagnetic field exhibits a circular symmetrization (irrespective of $\phi$ coordinate), and only $H\phi$ exists. This $H\phi$ is shown by the equation illustrated in FIG. 11B.

In FIG. 10, the magnetic field component of the tangential direction of the monopole <3> is $Ht=-(h/\rho)\times H\phi\sin\phi$, therefore the mutual reaction $B_{ij}$ is shown by the equation illustrated in FIG. 11C.

When the condition illustrated in FIG. 12 is substituted in this equation, the mutual reaction $B_{ij}$ is shown by the equation illustrated in FIG. 13A.

Further, the distance r between monopoles can be approximated, as previously explained, by the following equation:

$$r=(z^2+t^2-2zt\cos\phi+h^2)^{1/2}\approx r_0+d,$$

therefore the mutual reaction $B_{ij}$ can be shown by the equation illustrated in FIG. 13B.

From this, the mutual reaction $B_{13}$ between the monopole <1> and the monopole <3> and the mutual reaction $B_{14}$ between the monopole <1> and the monopole <4> are shown by the equations illustrated in FIG. 14.

In order to change the equations to a simpler form, $z-z_0=u$, $t-t_0=v$, and $w=-t+t_2$ are set. Further, when the polynomial approximation such as:

$$\sin ku\approx ku-(ku)^3/6 \quad \cos ku\approx 1-(ku)^2/2$$

is carried out while assuming that the monopole is short, the second term on the right side of the mutual reaction $B_{13}$ is converted as in the equation illustrated in FIG. 15 and finally represented as in the equation illustrated in FIG. 16.

Here, when rewriting the coefficients of the terms of $k^2$ etc. to $P_1$ to $P_8$, this equation is represented as follows:

$$P_1k^2+P_2k^4+P_3k^6+P_4k^8+j(P_5k^3+P_6k^5+P_7k^7+P_8k^9)$$

Similarly, also the first term on the right side of the mutual reaction $B_{13}$ is converted as in the equation illustrated in FIG. 17 and finally represented as in the equation illustrated in FIG. 18.

Here, when rewriting the coefficients of the terms of $k^2$ etc. to $Q_1$ to $Q_8$, this equation is represented as follows:

$$Q_1k^4+Q_2k^6+Q_3k^8+Q_4k^{10}+j(Q_5k^3+Q_6k^5+Q_7k^7+Q_8k^9)$$

From this, the mutual reaction $B_{13}$ is represented as follows:

$$B_{13}=[h_1\sin\phi_1/(4\pi\sin kd_1\cdot\sin kd_3)]\,e^{-jkr0}\times[P_1k^2+P_2k^4+P_3k^6+P_4k^8+j(P_5k^3+P_6k^5+P_7k^7+P_8k^9)+Q_1k^4+Q_2k^6+Q_3k^8+Q_4k^{10}+j(Q_5k^3+Q_6k^5+Q_7k^7+Q_8k^9)]$$

Further, when an approximate expression such as "$\sin kd_1\cdot\sin kd_3\approx d_1d_3k^2$" is used, the mutual reaction $B_{13}$ is represented as follows:

$$\begin{aligned}B_{13}&=[h_1\sin\phi_1/(4\pi d_1d_3)]e^{-jkr0}\times\{P_1+(P_2+Q_1)k^2+\\&(P_3+Q_2)k^4+(P_4+Q_3)k^6+Q_4k^8+j[(P_5+Q_5)k+\\&(P_6+Q_6)k^3+(P_7+Q_7)k^5+(P_8+Q_8)k^7]\}\\&=e^{-jkr0}[R_1+R_2k^2+R_3k^4+R_4k^6+R_5k^8+j(R_6k+R_7k^3+\\&R_8k^5+R_9k^7)]\end{aligned}$$

Also the mutual reaction $B_{14}$ can be similarly found. The mutual reaction $B_{14}$ is shown below.

$$B_{14}=e^{-jkr0}[S_1+S_2k^2+S_3k^4+S_4k^6+S_5k^8+j(S_6k+S_7k^3+S_8k^5+S_9k^7)]$$

In this way, the mutual reaction $(B_{13}+B_{14})$ can be represented by the polynomial of the wave number k as shown below.

$$B_{13}+B_{14}=e^{-jkr0}[C_1+C_2k^2+C_3k^4+C_4k^6+C_5k^8+j(C_6k+C_7k^3+C_8k^5+C_9k^7)]$$

When the mutual reaction between the monopole <2> and the monopole <3> is represented by $B_{23}$, and the mutual reaction between the monopole <2> and the monopole <4> is represented by $B_{24}$, the mutual reaction $(B_{23}+B_{24})$ can be similarly found, therefore the mutual reaction $(B_{13}+B_{14}+B_{23}+B_{24})$ also can be represented by the polynomial of the wave number k similar to the above equation.

Namely, the mutual reaction $B_{ij}$ can be approximated as follows:

$$B_{ij}=e^{-jkr0}[(a_0+a_1f^2+a_2f^4+a_3f^6+a_4f^8+\ldots)+j(b_0f+b_1f^3+b_2f^5+b_3f^7+b_4f^9+\ldots)]$$

Next, a detailed explanation will be made of the present invention according to the flow of processing executed by the simulation apparatus 1 of the present invention. Note that, in the embodiment explained below, for convenience of explanation, it is assumed that the simulation is executed without considering the mutual admittance and mutual reaction.

Figure 19:
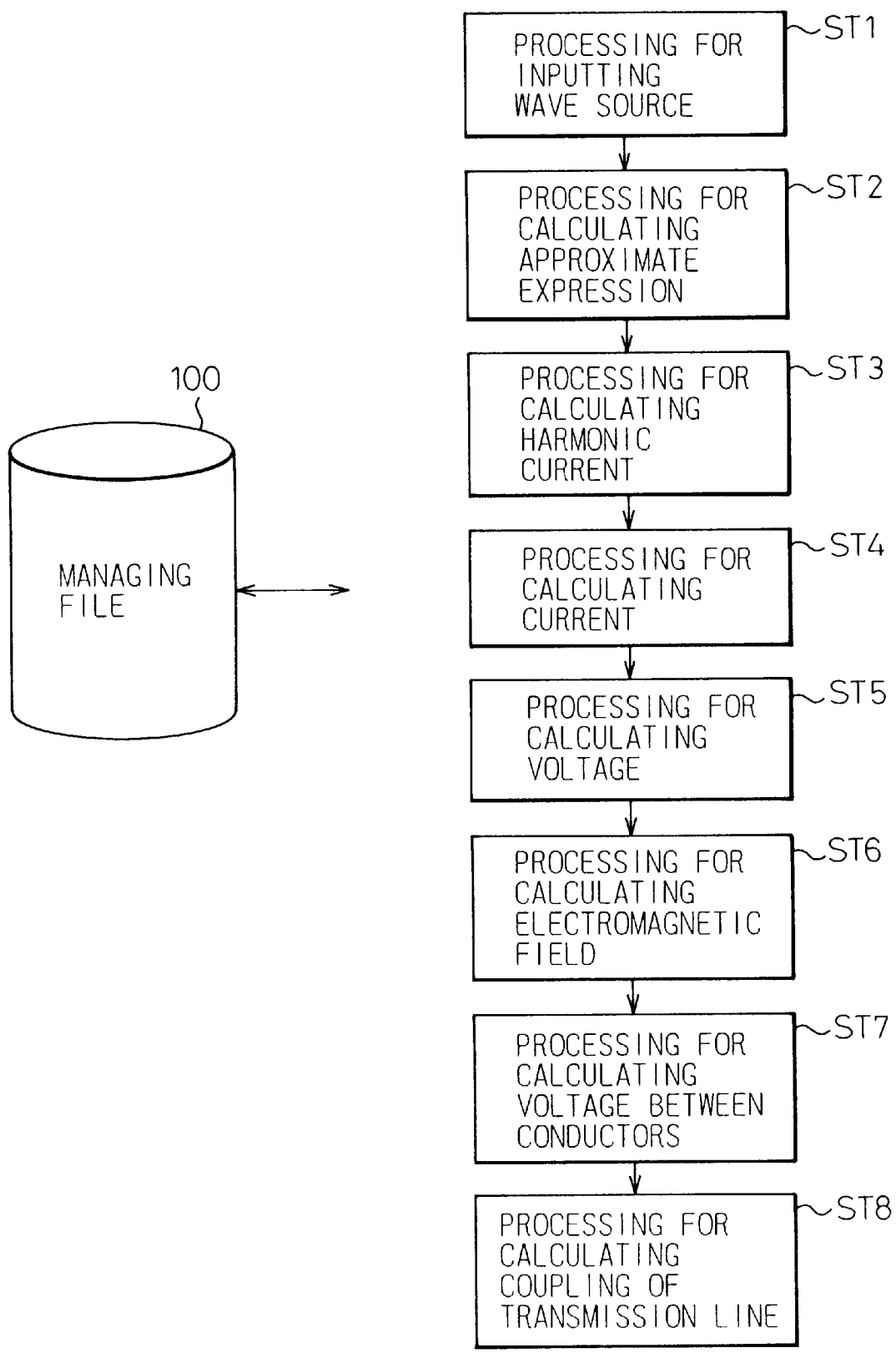
FIG. 19 is a view of an embodiment of the present invention.

FIG. 19 illustrates one embodiment of the flow of processing executed by the simulation apparatus 1 of the present invention. Here, in the diagram, 100 is a management file, which manages the configuration information of the electronic apparatus to be simulated divided into elements.

As shown in this processing flow, the simulation apparatus 1 of the present invention first executes "processing for inputting wave source" at step 1 (ST1), executes "processing for calculating approximate expression" at step 2 (ST2), executes "processing for calculating harmonic current" at step 3 (ST3), executes "processing for calculating current" at step 4 (ST4), executes "processing for calculating voltage" at step 5 (ST5), executes "processing for calculating electromagnetic field" at step 6 (ST6), executes "processing for calculating voltage between conductors", at step 7 (ST7), and executes "processing for calculating coupling of transmission line" at step 8 (ST8).

Figure 20:
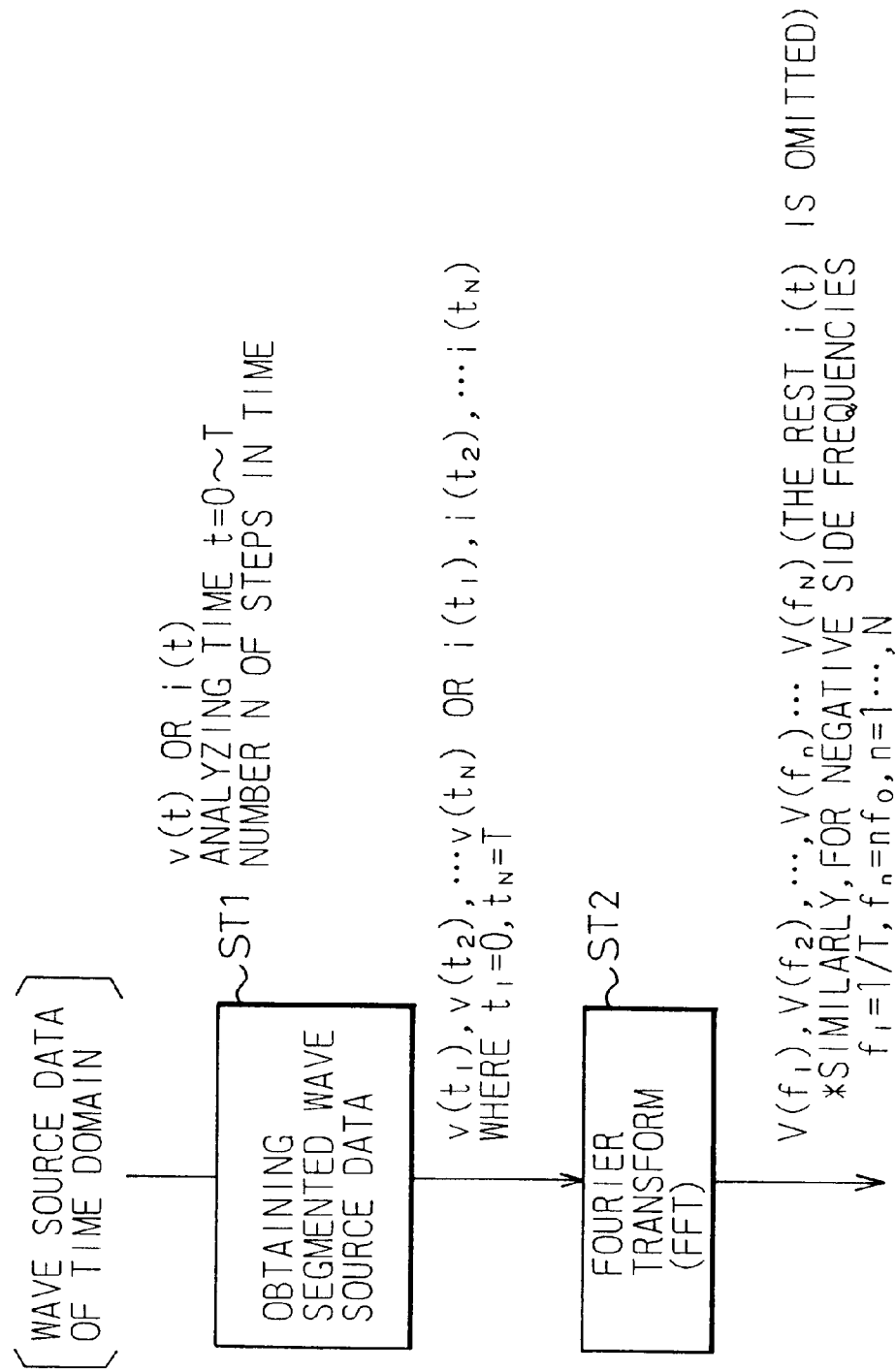
FIG. 20 shows an embodiment of the flow of processing for inputting a wave source.

FIG. 20 illustrates one embodiment of the flow of the "processing for inputting wave source" of ST1 of FIG. 19.

As shown in this processing flow, in the "processing for inputting wave source", the wave source data of the time domain is read from the management file 100. The thus read data is segmented and Fourier-transformed to obtain the frequency spectrum of the wave source.

Figure 21:
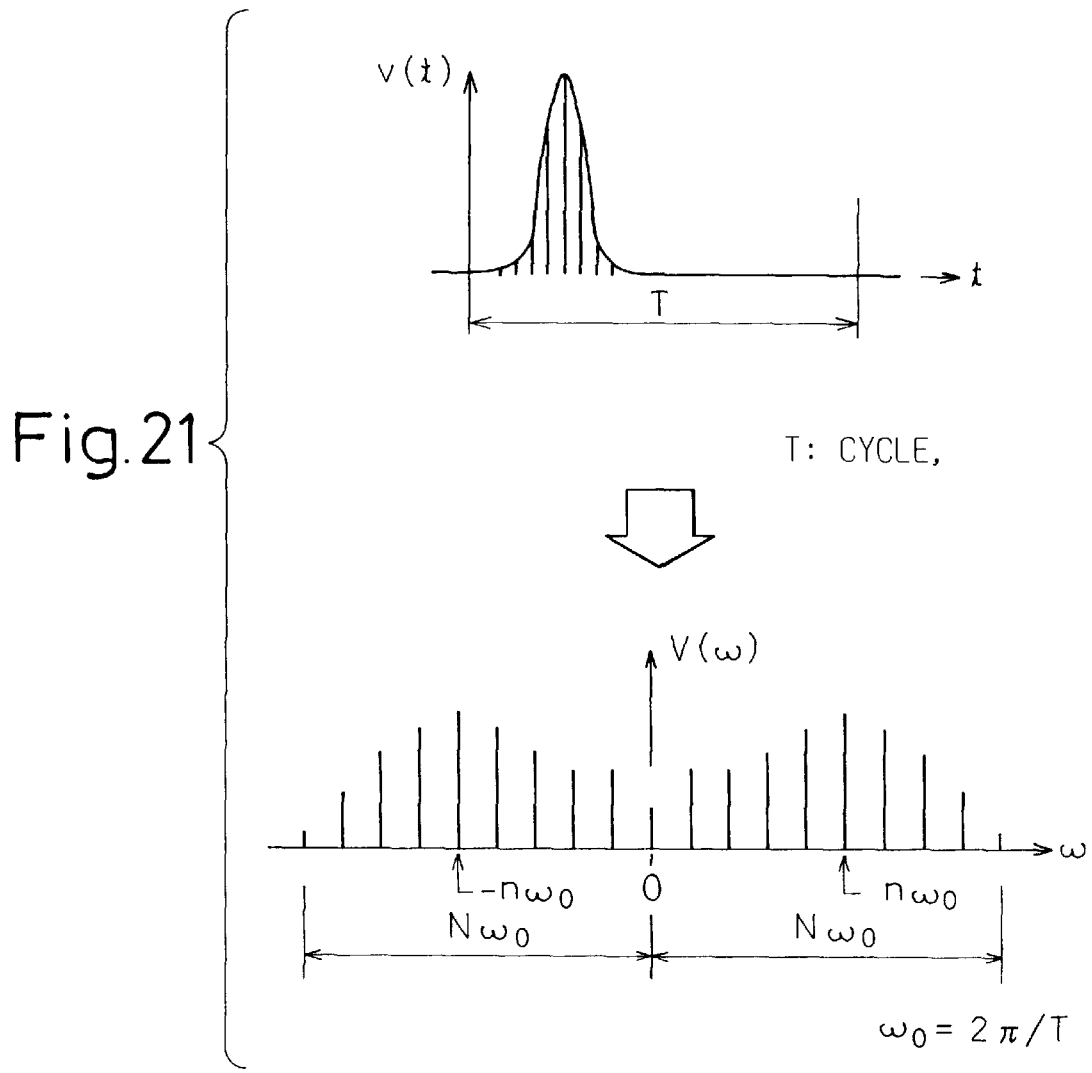
FIG. 21 is an explanatory view of the processing for inputting a wave source.

Namely, as shown in FIG. 21, the time series data of wave source is segmented and Fourier-transformed to obtain the frequency spectrum of the wave source. At this time, when the DC component of this frequency spectrum is necessary, according to Ohm's Law, the DC component thereof will be obtained.

Figure 22A:
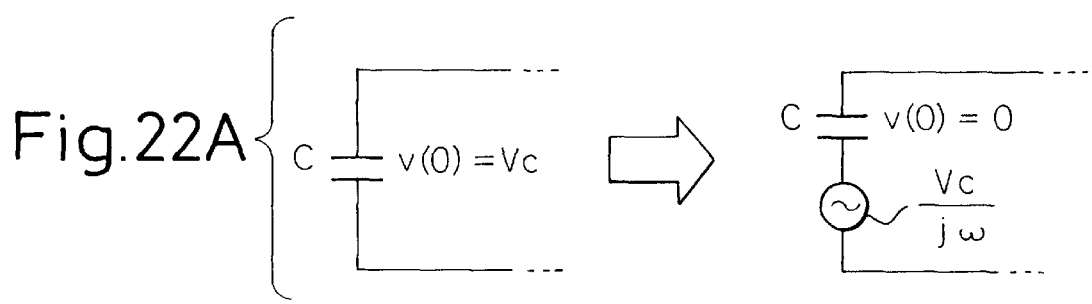
FIGS. 22A and 22B are explanatory views of a wave source for an impulse test.
Figure 22B:
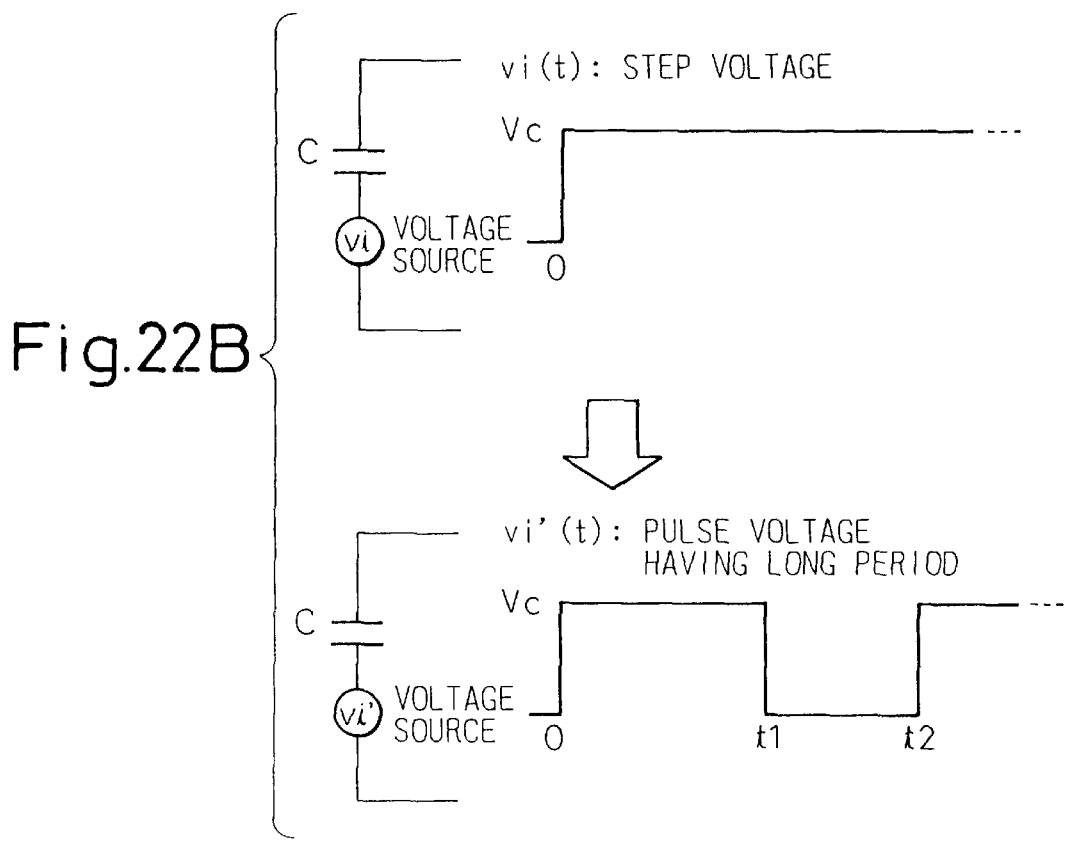

As a test for electronic apparatus, there is a test applying a high voltage impulse or applying a high current impulse and investigating the influence by this. In order to simulate this, it is necessary to assume a capacitor charged with an initial voltage as the wave source or assume an inductor applied with an initial current as the wave source.

Where there is a wave source comprised of a capacitor charged with the initial voltage, this wave source is converted to an equivalent circuit as shown in FIG. 22A. Further, since periodicity is necessary for applying the Fourier transform, as shown in FIG. 22B, a step voltage produced by this equivalent circuit will be dealt with as a pulse voltage having long periods t1 and t2 for convenience. The influence by the initial voltage of the capacitor generally exhibits a damped oscillation phenomenon, therefore the time until this damped oscillation phenomenon converges is preliminarily predicted, and a value of more than the predicted time is given to t1 and t2.

Figure 23A:
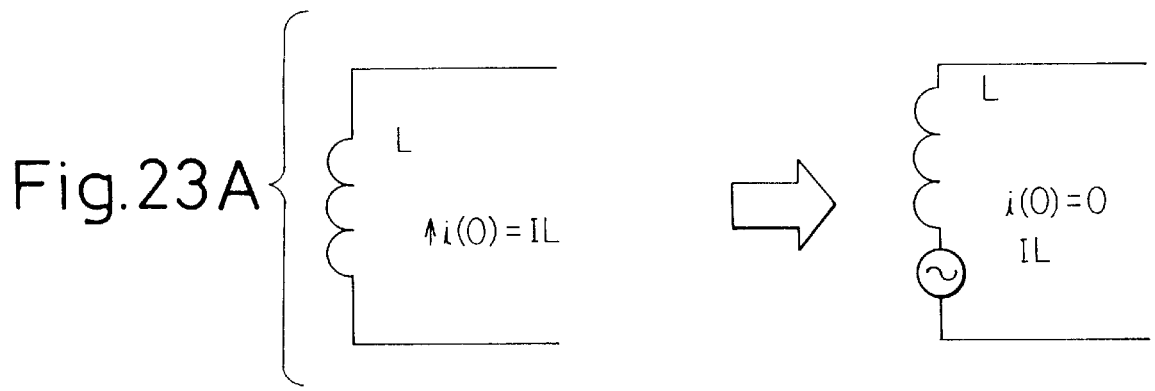
FIGS. 23A and 23B are explanatory views of the wave source for the impulse test.
Figure 23B:
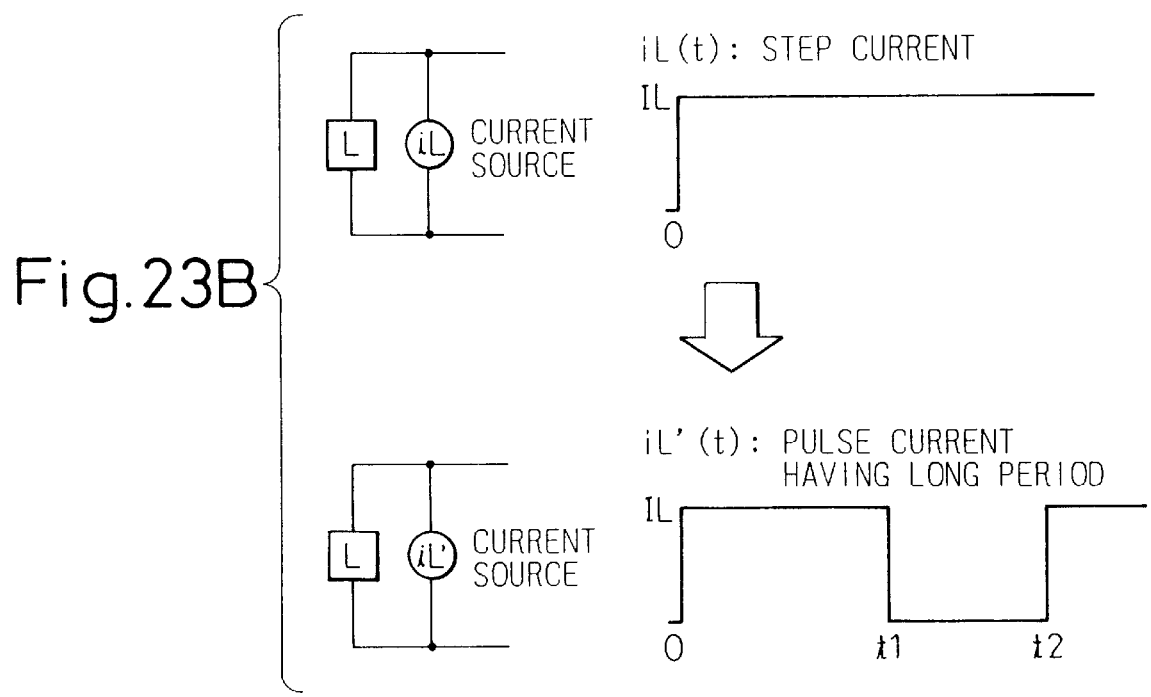

Further, where there is a wave source comprised of an inductor applied with the initial current, this wave source is converted to the equivalent circuit as shown in FIG. 23A. Further, since periodicity is necessary for applying the Fourier transform, as shown in FIG. 23B, a step current produced by this equivalent circuit will be dealt with as a pulse current having long periods t1 and t2 for convenience. The influence by the initial current of the inductor generally exhibits a damped oscillation phenomenon, therefore the time until this damped oscillation phenomenon converges is preliminarily predicted, and a value of more than the predicted time is given to t1 and t2.

In this way, in the "processing for inputting wave source", when the wave source data of the time domain is read from the management file 100, the read data is segmented and Fourier-transformed to obtain the frequency spectrum of the wave source, then the routine proceeds to the "processing for calculating approximate expression" as already mentioned (ST2 of FIG. 19).

Figure 24:
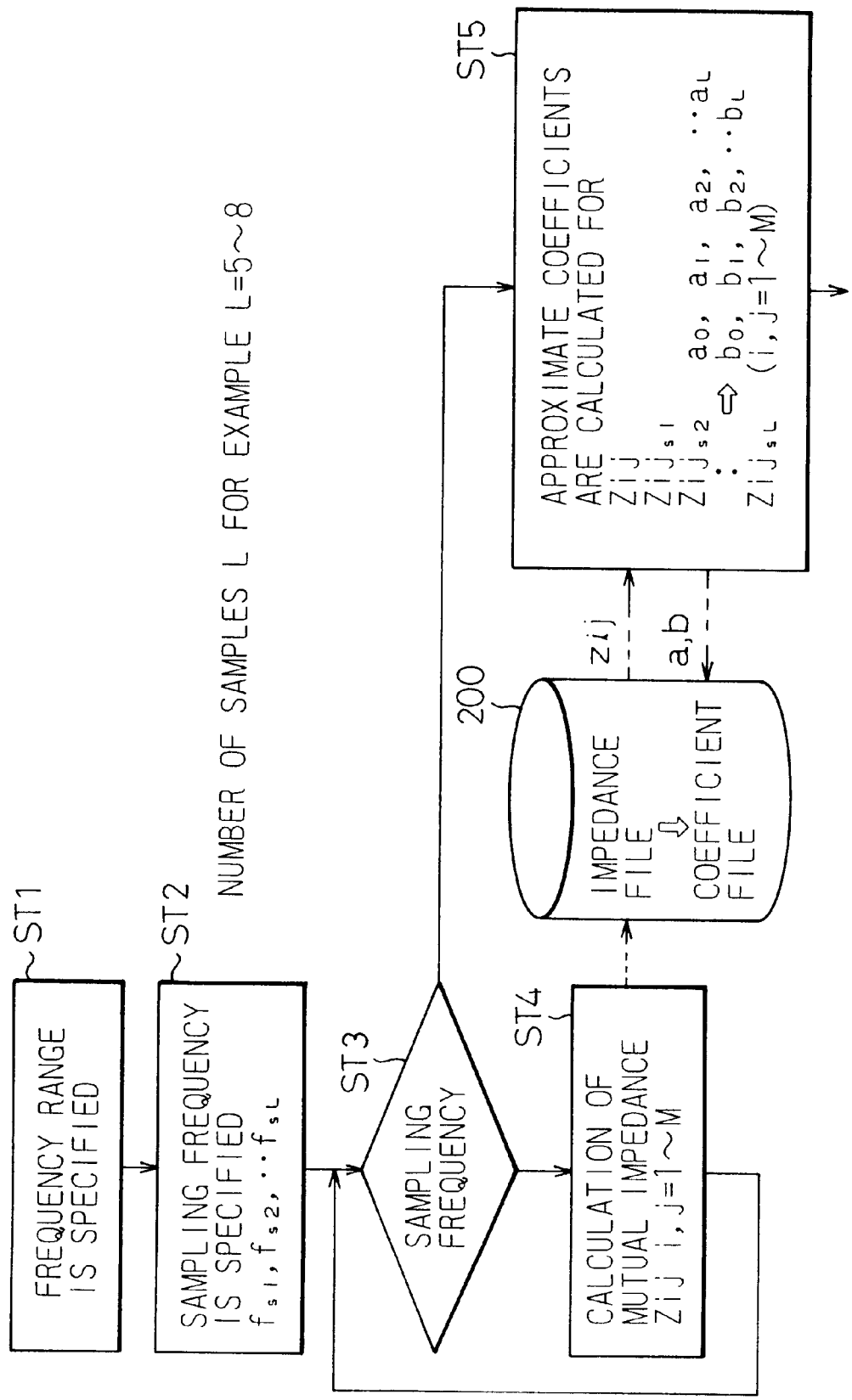
FIG. 24 shows an embodiment of the flow of the processing for calculating an approximate expression.

FIG. 24 illustrates one embodiment of the flow of the "processing for calculating approximate expression".

As shown in this flow of processing, in the "processing for calculating approximate expression", first of all, at step 1 (ST1), the frequency range to be simulated is specified from among the positive side frequencies of the frequency spectrum of the wave source obtained in the "processing for inputting wave source". Where a high precision is desired, the entire range of that frequency is specified. Where shortening the processing time is given priority over precision, the harmonic components of that frequency are removed and the frequency is specified to be within a narrow range.

Subsequently, at step 2 (ST2), some sampling frequencies are specified from among the frequencies of this specified range. For example, the five sampling frequencies of $f_{s1}$, $f_{s2}$, $f_{s3}$, $f_{s4}$, and $f_{s5}$ are selected. The sampling frequencies are selected from among frequencies of the range specified in for example step 1 (ST1) by roughly equally dividing this frequency range. Here, where a high precision is desired, the number of samples will be increased, while where shortening the processing time is given priority over precision, the number of samples will be decreased.

Subsequently, at step 3 (ST3), when one sampling frequency is selected from among the unprocessed sampling frequencies, at the subsequent step 4 (ST4), the mutual impedance $Z_{ij}$ (i, j=1 to M) between the element i and element j with respect to the selected sampling frequency is calculated according to an accurate calculation method and the calculated value is stored in a working file 200, then the processing routine returns to the start of step 3 (ST3).

At step 3 (ST3), when the selection of all sampling frequencies is ended, it is decided that the calculation of the mutual impedance $Z_{ij}$ (i, j=1 to M) for all sampling frequencies is ended and the processing routine proceeds to step 5 (ST5), at which the mutual impedance $Z_{ij}$ is approximated as:

$$Z_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j). The sampling frequency and that mutual impedance $Z_{ij}$ stored in the working file 200 are substituted in this approximate expression to prepare simultaneous equations using the coefficients $a_0$ to $a_L$ and $b_0$ to $b_L$ as unknown numbers. The simultaneous equations are solved to seek this approximate expression to find coefficients $a_0$ to $a_L$ and $b_0$ to $b_L$. These coefficients are stored in the working file 200.

For example, when the mutual impedances $Zij_{s1}$ to $Zij_{s5}$ between the element i and element j for five sampling frequencies $f_{s1}$ to $f_{s5}$ have been found in the following way:

$$Zij_{s1}=\alpha ij_{s1}+j\beta ij_{s1}$$

$$Zij_{s2}=\alpha ij_{s2}+j\beta ij_{s2}$$

$$Zij_{s3}=\alpha ij_{s3}+j\beta ij_{s3}$$

$$Zij_{s4}=\alpha ij_{s4}+j\beta ij_{s4}$$

$$Zij_{s5}=\alpha ij_{s5}+j\beta ij_{s5},$$

the following simultaneous equations are prepared:

$$\alpha ij_{s1}=\exp[-j(2\pi f_{s1}/c)r_0][a_0+a_1 f_{s1}^2+a_2 f_{s1}^4+a_3 f_{s1}^6+a_4 f_{s1}^8]$$

$$\alpha ij_{s2}=\exp[-j(2\pi f_{s2}/c)r_0][a_0+a_1 f_{s2}^2+a_2 f_{s2}^4+a_3 f_{s2}^6+a_4 f_{s2}^8]$$

$$\alpha ij_{s3}=\exp[-j(2\pi f_{s3}/c)r_0][a_0+a_1 f_{s3}^2+a_2 f_{s3}^4+a_3 f_{s3}^6+a_4 f_{s3}^8]$$

$$\alpha ij_{s4}=\exp[-j(2\pi f_{s4}/c)r_0][a_0+a_1 f_{s4}^2+a_2 f_{s4}^4+a_3 f_{s4}^6+a_4 f_{s4}^8]$$

$$\alpha ij_{s5}=\exp[-j(2\pi f_{s5}/c)r_0][a_0+a_1 f_{s5}^2+a_2 f_{s5}^4+a_3 f_{s5}^6+a_4 f_{s5}^8]$$

and $$\beta ij_{s1}=\exp[-j(2\pi f_{s1}/c)r_0][b_0+b_1 f_{s1}^2+b_2 f_{s1}^4+b_3 f_{s1}^6+b_4 f_{s1}^8]$$

$$\beta ij_{s2}=\exp[-j(2\pi f_{s2}/c)r_0][b_0+b_1 f_{s2}^2+b_2 f_{s2}^4+b_3 f_{s2}^6+b_4 f_{s2}^8]$$

$$\beta ij_{s3}=\exp[-j(2\pi f_{s3}/c)r_0][b_0+b_1 f_{s3}^2+b_2 f_{s3}^4+b_3 f_{s3}^6+b_4 f_{s3}^8]$$

$$\beta ij_{s4}=\exp[-j(2\pi f_{s4}/c)r_0][b_0+b_1 f_{s4}^2+b_2 f_{s4}^4+b_3 f_{s4}^6+b_4 f_{s4}^8]$$

$$\beta ij_{s5}=\exp[-j(2\pi f_{s5}/c)r_0][b_0+b_1 f_{s5}^2+b_2 f_{s5}^4+b_3 f_{s5}^6+b_4 f_{s5}^8]$$

By solving the simultaneous equations, the coefficients $a_0$ to $a_4$ and $b_0$ to $b_4$ are found, and the following approximate expression of the mutual impedance $Z_{ij}$ between the element i and element j is generated:

$$Z_{ij}=e^{-jkr_0}[(a_0+a_1 f^2+a_2 f^4+a_3 f^6+a_4 f^8)+j(b_0 f^{-1}+b_1 f+b_2 f^3+b_3 f^5+b_4 f^7)]$$

Note that the execution of this "processing for calculating approximate expression" becomes independent for every sampling frequency and therefore a further higher speed processing can be carried out if a parallel computer is used.

When the approximate expression expressing the mutual impedance $Z_{ij}$ (i, j=1 to M) between the element i and element j is sought by the "processing for calculating approximate expression" in this way, and the routine enters the "processing for calculating harmonic current" (ST3 of FIG. 19).

Figure 25:
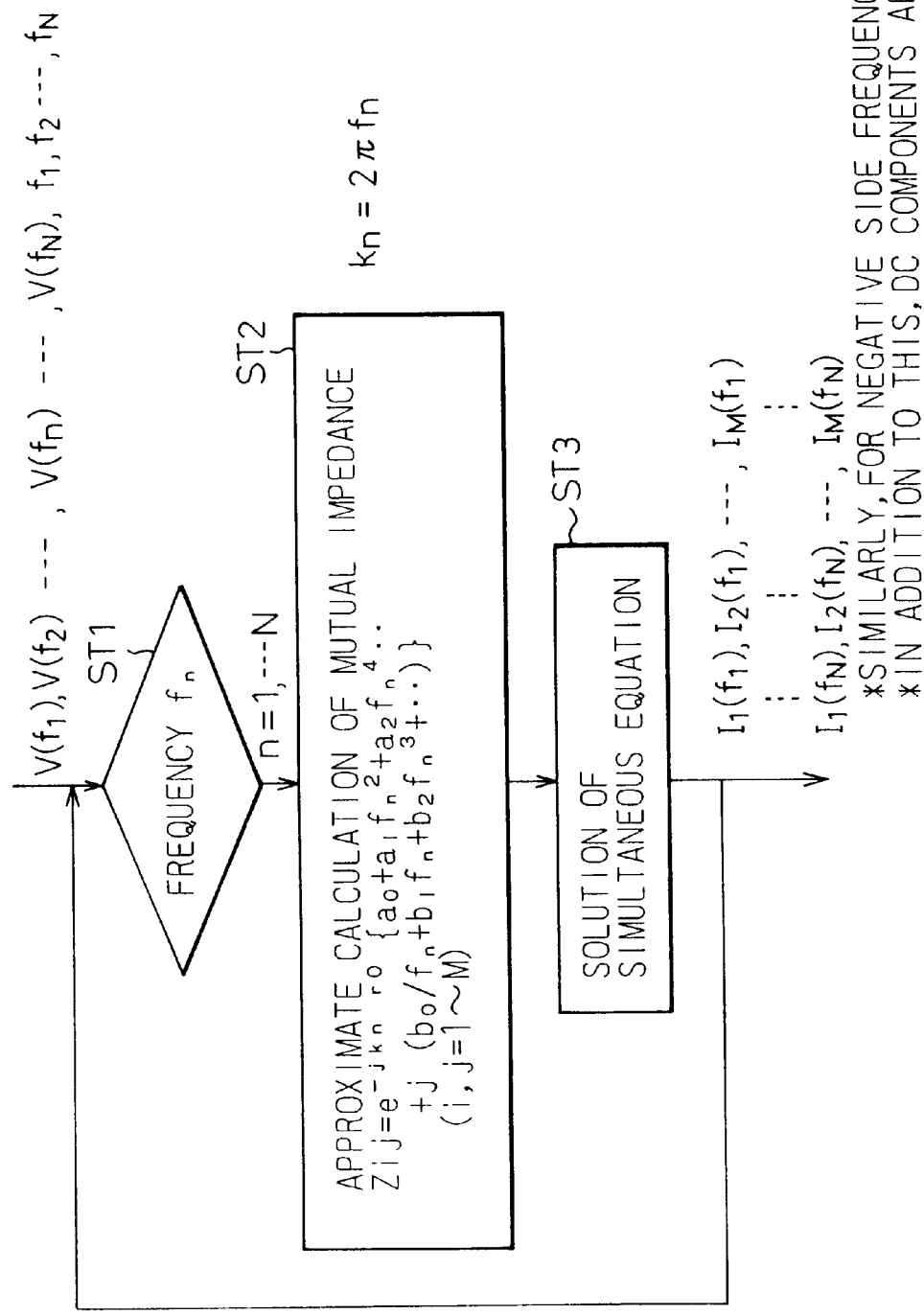
FIG. 25 shows an embodiment of the flow of the processing for calculating a harmonic current.

FIG. 25 illustrates one embodiment of the flow of the "processing for calculating harmonic current".

As shown in this flow of processing, in the "processing for calculating harmonic current", if the frequency spectrum of a wave source having a positive side frequency obtained at the "processing for inputting wave source" is input, first one unprocessed frequency is selected from among the positive side frequencies at step 1 (ST1).

Subsequently, at step 2 (ST2), the selected frequency is substituted in the approximate expression of the mutual impedance $Z_{ij}$ found by the "processing for calculating approximate expression" to seek the mutual impedance $Z_{ij}$ (i, j=1 to M) between the element i and element j with respect to the selected frequency. The calculation of this mutual impedance $Z_{ij}$ is a simple substitution calculation, therefore it can be executed at an extremely high speed.

Subsequently, at step 3 (ST3), the simultaneous equations under the moment method shown in FIG. 26 are solved by using the mutual impedance $Z_{ij}$ (i, j=1 to M) calculated at step 2 (ST2) and the frequency spectrum $V(\omega)$ ($\omega=2\pi f_q$) of the wave source specified by the frequency $f_q$ selected at step 1 (ST1) to find the currents $I_1(f_q)$ to $I_M(f_q)$ flowing in each element at the frequency $f_q$ selected at step 1 (ST1). This processing is repeated until the selection of the frequency is ended at step 1. Thus, the currents $I_1(f_q)$ to $I_M(f_q)$ flowing in each element over input overall frequencies $f_q$(q=1 to N) are found.

Here, in the simultaneous equations under the moment method shown in FIG. 26, it is assumed that the wave source $V(\omega)$ exists in the element m. Note that, at the time of solution of the simultaneous equations under the moment method, if for example the LU breakdown method (disclosed in Japanese Patent Application No. 7-342695) devised by the present inventors is used, a further higher processing speed can be achieved.

The frequency spectrum of the wave source obtained by the "processing for inputting wave source" includes a spectrum having a negative side frequency as shown in FIG. 21. As mentioned above, in the "processing for calculating approximate expression" and the "processing for calculating harmonic current", only the current induced by a wave source having the positive side frequency has been calculated. Due to this, it is necessary to calculate the current induced by a wave source having a negative side frequency.

This calculation is carried out by utilizing the fact that a conjugate relationship stands between the currents $I_m(\omega)$ and $I_m(-\omega)$ flowing in each element m since there is a conjugate relationship between the $Z_{ij}$ ($\omega$) and $Z_{ij}(-\omega)$ as follows:

$$Z_{ij}(\omega)=e^{-jkr_0}[(a_0+a_1 f^2+a_2 f^4+a_3 f^6+a_4 f^8)+j(b_0 f^{-1}+b_1 f+b_2 f^3+b_3 f^5+b_4 f^7)]$$

$$Z_{ij}(-\omega)=e^{-jkr_0}[(a_0+a_1 f^2+a_2 f^4+a_3 f^6+a_4 f^8)-j(b_0 f^{-1}+b_1 f+b_2 f^3+b_3 f^5+b_4 f^7)]$$

and there is a conjugate relationship between the frequency spectrum $V(\omega)$ and $V(-\omega)$ of the wave source. Namely, the current $I_m(-\omega)$ induced by a wave source having a negative side frequency can be found by inverting the sign of the imaginary part of the current $I_m(\omega)$ induced by the wave source having the positive side frequency.

Note that the execution of this "processing for calculating harmonic current" becomes independent for every frequency, therefore this means that the processing can be performed at a further higher speed if a parallel computer is used.

In this way, when the current flowing in each element at respective frequencies are found by the "processing for calculating harmonic current", and the routine enters the "processing for calculating current" (ST4 of FIG. 19).

Figure 27:
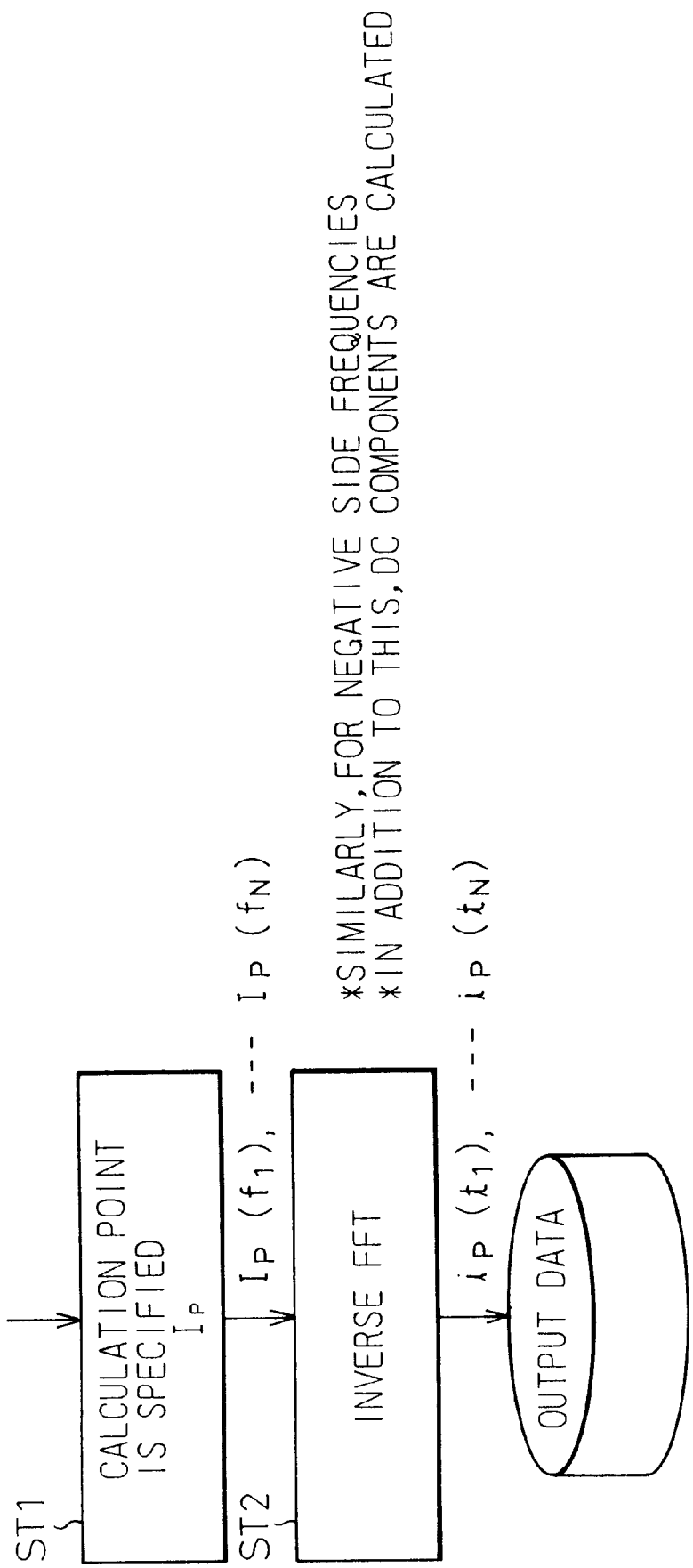
FIG. 27 shows an embodiment of the flow of processing for calculating a current.

FIG. 27 illustrates an embodiment of the flow of the "processing for calculating current".

As shown in this flow of processing, in this "processing for calculating current", first of all, when the point p (element p) at which the current must be calculated is specified by interactive processing with the user (ST1), the currents "$I_P(f_1)$ to $I_P(f_N)$, $I_P(0)$, and $I_P(-f_1)$ to $I_P(-f_N)$" flowing through the specified point p at respective frequencies are extracted, then inverse Fourier transform is applied (ST2) so as to calculate the current of the time domain flowing through that specified point p.

When the current of the time domain flowing through the specified point is found by the "processing for calculating current" in this way, the routine enters the "processing for calculating voltage" (ST5 of FIG. 19).

Figure 28:
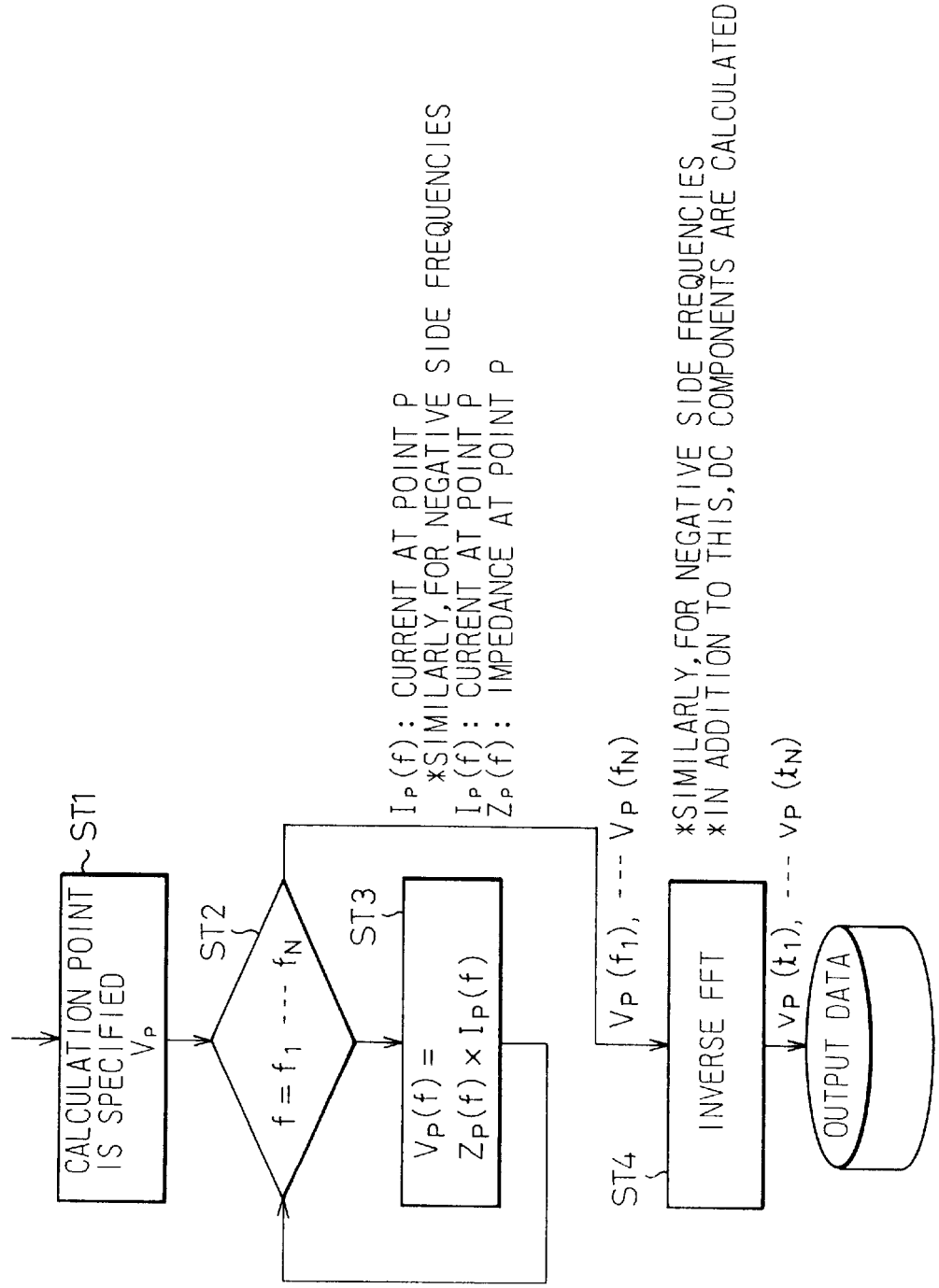
FIG. 28 shows an embodiment of the flow of processing for calculating a voltage.

FIG. 28 illustrates one method of the flow of this "processing for calculating voltage".

As shown in this flow of processing, in this "processing for calculating voltage", first of all, when the point p (element p) at which the voltage must be calculated is specified by interactive processing with the user (ST1), the currents "$I_P(f_1)$ to $I_P(f_N)$, $I_P(0)$, and $I_P(-f_1)$ to $I_P(-f_N)$" flowing through the specified point p at respective frequencies are extracted (ST2), then the extracted values are multiplied with the impedances "$Z_P(f_1)$ to $Z_P(f_N)$, $Z_P(0)$, and $Z_P(-f_1)$ to $Z_P(-f_N)$" of the specified point p for each corresponding frequency to find the voltages "$V_P(f_1)$ to $V_P(f_N)$, $V_P(0)$, and $V_P(-f_1)$ to $V_P(-f_P)$" generated at the specified point p at respective frequencies (ST3).

Subsequently, the thus found voltages "$V_P(f_1)$ to $V_P(f_N)$, $V_P(0)$, and $V_P(-f_1)$ to $V_P(-f_N)$" at respective frequencies are subjected to inverse Fourier transform (ST4) to calculate the voltage of the time domain generated at the specified point p.

When the voltage of time domain flowing through the specified point is found by the "processing for calculating voltage" in this way, the routine enters the "processing for calculating electromagnetic field" (ST6 of FIG. 19).

Figure 29:
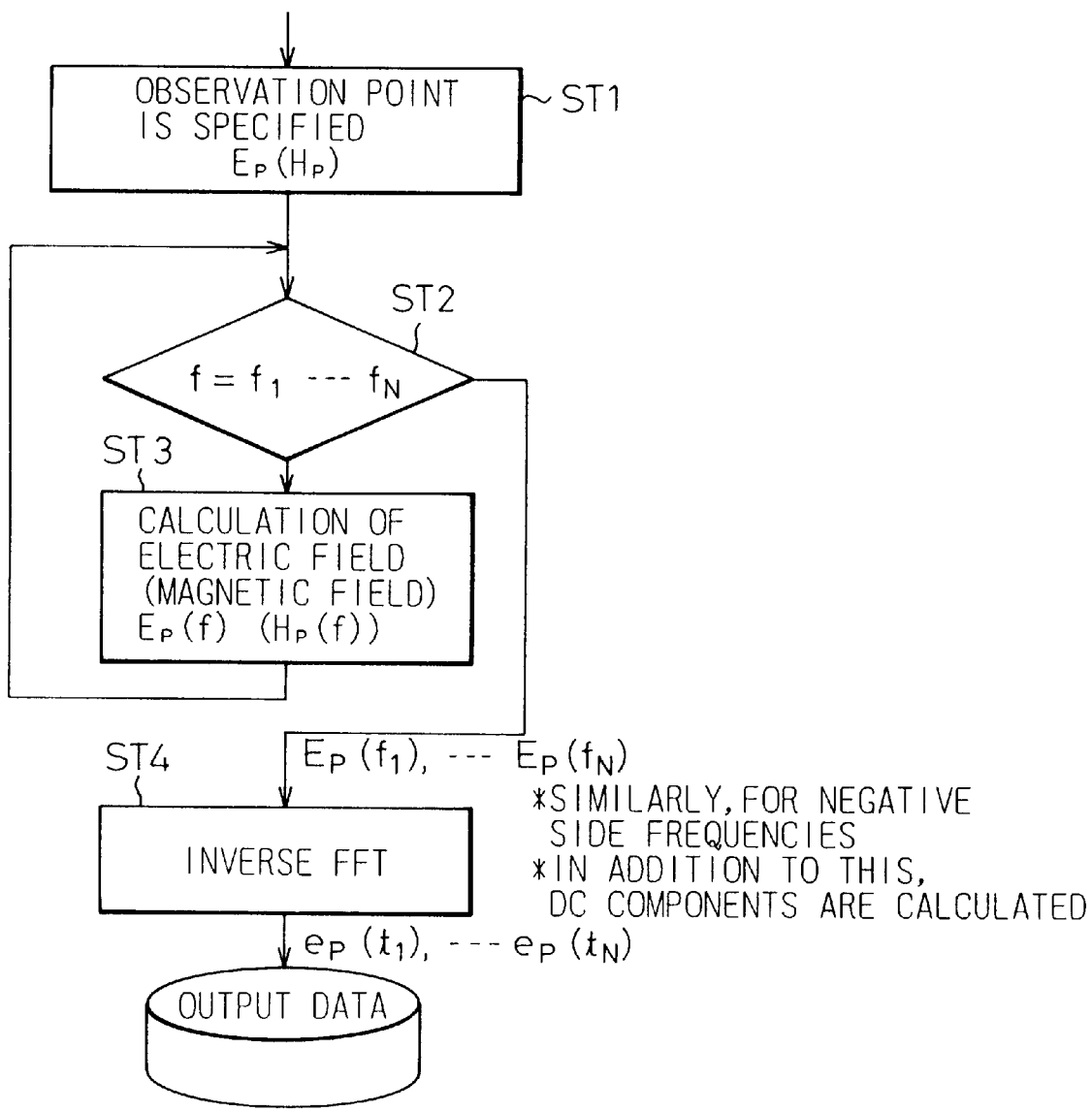
FIG. 29 shows an embodiment of the flow of processing for calculating an electromagnetic field.

FIG. 29 illustrates an embodiment of the flow of this "processing for calculating electromagnetic field".

As shown in this flow of processing, in the "processing for calculating electromagnetic field", explaining this by using as an example a case where the electric field intensity is calculated, first of all, when the observation point p is specified by interactive processing with the user (ST1), the electric field generated at the observation point p by the currents flowing in each element at respective frequencies is found according to known theoretical formulas of electromagnetic fields to find the electric fields "$E_P(f_1)$ to $E_P(f_N)$, $E_P(0)$, and $E_P(-f_1)$ to $E_P(-f_N)$" generated at the observation point p at respective frequencies.

Subsequently, inverse Fourier transform is applied to the found electric fields "$E_P(f_1)$ to $E_P(f_N)$, $E_P(0)$, and $E_P(-f_1)$ to $E_P(-f_N)$" at respective frequencies (ST4) to calculate the electric field of the time domain generated at the observation point p. Similarly, also the magnetic field is calculated.

When the electromagnetic field of the observation point is sought by the "processing for calculating electromagnetic field" in this way, the routine enters the "processing for calculating voltage between conductors" (ST7 of FIG. 19).

In this "processing for calculating voltage between conductors", when the position p between conductors to be processed is specified by interactive processing with the user (ST1), if the current at the angular frequency ω flowing in the element n is defined as $I_n(\omega)$ and if the mutual impedance at the angular frequency ω between the position p between conductors and the element n is defined as $Z_{Pn}(\omega)$, the voltage $V_P(\omega)$ between conductors at the angular frequency ω may be calculated by:

$$V_p(\omega) \approx -\sum_{n=1}^{M} I_n(\omega) Z_{pn}(\omega) \qquad \text{Formula 1}$$

By this, the voltages "$V_P(f_1)$ to $V_P(f_N)$, $V_P(0)$, and $V_P(-f_1)$ to $V_P(-f_N)$" between the conductors at respective frequencies may be found.

Subsequently, by applying inverse Fourier transform to the thus found voltages "$V_P(f_1)$ to $V_P(f_N)$, $V_P(0)$, and $V_P(-f_1)$ to $V_P(-f_N)$" between the conductors at respective frequencies, the voltage between conductors of the time domain generated at the position p between the conductors is calculated.

Figure 30:
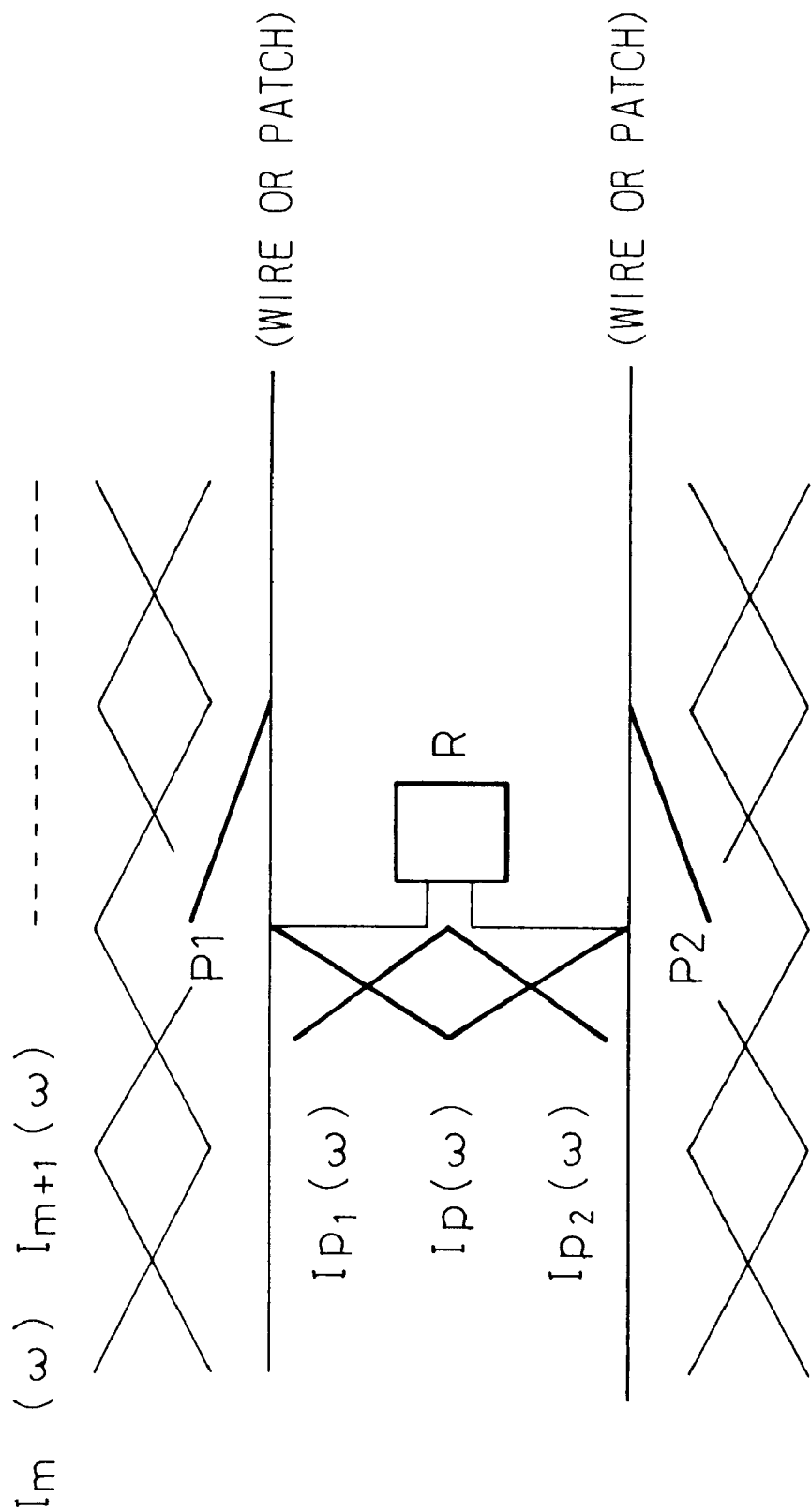
FIG. 30 is a first explanatory view of the derivation of the voltage between conductors.

Explaining the logic for generating formula 1, as shown in FIG. 30, if a resistor R is inserted between the conductors represented by p1 and p2, due to the boundary condition that the electric field around each conductor becomes zero, the equation illustrated in FIG. 31A stands. From this, the current Ip between the conductors is found as in the equation illustrated in FIG. 31B, therefore the voltage $V_P$ between conductors is found as in the equation illustrated in FIG. 31C. In actuality, the current does not flow between the conductors, therefore "$R \to \infty$, $I_{P1}, I_{P2} \to 0$" is substituted in the equation illustrated in FIG. 31C. By this, formula 1 can be obtained.

Namely, formula 1 is derived from the voltage spectrum generated by a resistor imaginarily inserted between the conductors, when the resistance is made infinite large.

When the voltage between conductors specified by the "processing for calculating voltage between conductors" is found in this way, the routine enters the "processing for calculating coupling of transmission line" (ST8 of FIG. 19).

This "processing for calculating coupling of transmission line" is carried out for simulating the degree of application of current or voltage to the receiver circuit etc. due to its external electric field of a transmission line mounted above a wide ground plane.

Figure 32:
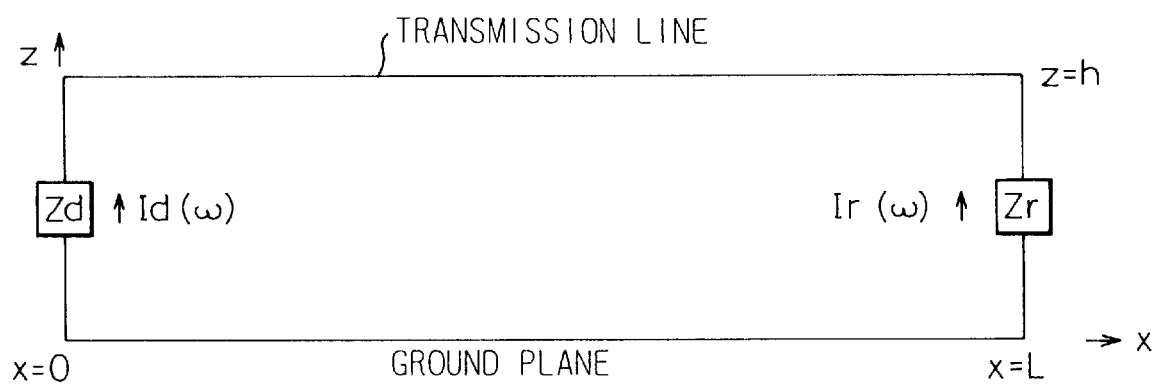
FIG. 32 is a first explanatory view of the processing for calculating the coupling of transmission line.

Assume the transmission line mounted above the wide ground plane as shown in FIG. 32. Here, if the impedance at the transmitting end is represented by $Z_d$, the impedance at the receiving end is represented by $Z_r$, the length of the transmission line is represented by L, the height of the transmission line is represented by h, the propagation constant of the transmission line is represented by β, the characteristic impedance of the transmission line is represented by $Z_0$, the x component of the electric field incident upon the position (x,z) of the transmission line due to the distribution of currents across the other conductor is represented by $Ex^i(x,z)$, and the z component of the electric field incident upon the position (x,z) of the transmission line due to the distribution of currents across the other conductor is represented by $Ez^i(x,z)$, K(x) is defined as follows:

$$K(x) = Ex^i(x,h) - Ex^i(x,0) \qquad \text{Formula 2}$$

and D is defined as follows:

$$D = (Z_0 Z d + Z_0 Z r)\cos\beta L + j(Z_0^2 + Z d Z r)\sin\beta L \qquad \text{Formula 3}$$

Figure 33:
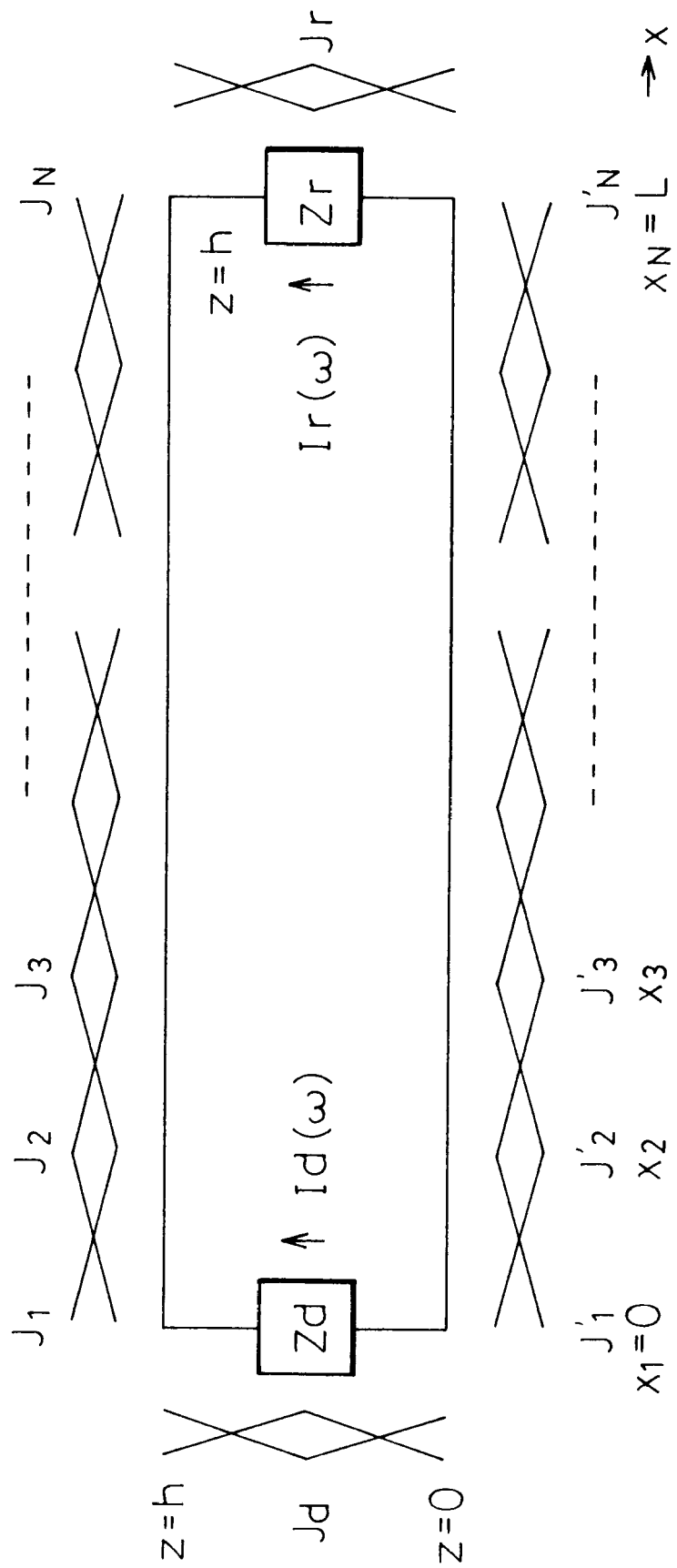
FIG. 33 is a second explanatory view of the processing for calculating the coupling of transmission line.

As shown in FIG. 33, when this transmission line is sectioned by the sinusoidal expansion function $J_1$ or the like similar to the moment method, $Ez^i$ and K(x) can be found by the current distribution of the other conductors and the mutual impedance calculated by the moment method as shown in the equation illustrated in FIG. 34. Here, $Z_{nm}$ is the mutual impedance between the upper line of the transmission line and the other conductor, and $Z_{nm}'$ is the mutual impedance between the lower line of the transmission line and the above other conductor.

On the other hand, when such external electric fields $Ex^i$ and $Ez^i$ exist, it is known that the current Id(ω) at the transmitting end side of this transmission line is found by "C. D. Taylor" as in the equation illustrated in FIG. 35. The term A in this equation is rewritten as in FIG. 36A, therefore in the end the current Id(ω) at the transmitting end side becomes as in the equation illustrated in FIG. 36B.

Further, when the external electric field exists, it is known that the current Ir(ω) at the receiving end side of this transmission line is found by "C. D. Taylor" as in the equation illustrated in FIG. 37. When this is rewritten, it becomes as in the equation illustrated in FIG. 38.

Note that the equation of "C. D. Taylor" is disclosed in "C. D. Taylor, R. S. Satterwite, and, C. W. Harrison, Jr., "The response of a terminated two-wire transmission line excited by a nonuniform electromagnetic field," IEEE Trans. Antennas Propagation., Ap-13, No. 6, pp. 987–989, November 1967."

From this, when the external electric fields $Ex^i$ and $Ez^i$ (that is $Ez^i$ and K(x)) are obtained with respect to the transmission line, the current Id(ω) at the transmitting end side and the current Ir(ω) at the receiving end side are found according to the equation found by "C. D. Taylor" and the found values are multiplied with the impedance to find the voltage Vd(ω) at the transmitting end side and the voltage Vr(ω) at the receiving end side.

Upon receipt of this, in the "processing for calculating coupling of transmission line", the currents "$I_P(f_1)$ to $I_P(f_N)$, $I_P(0)$, and $I_P(-f_1)$ to $I_P(-f_N)$" flowing through the transmitting end side and receiving end side at respective frequencies are found according to the equation found by "C. D. Taylor", and then are subjected to inverse Fourier transform to calculate the currents of time domain flowing through the transmitting end side and receiving end side. Further, the voltages "$V_P(f_1)$ to $V_P(f_N)$, $V_P(0)$, $V_P(-f_1)$ to $V_P(-f_N)$" produced at the transmitting end side and receiving end side at respective frequencies are found according to the equation found by "C. D. Taylor", and then are subjected to inverse Fourier transform to calculate the voltages of the time domain produced at the transmitting end side and receiving end side.

By this "processing for calculating coupling of transmission line", it becomes possible to simulate the degree of application of current or voltage to the receiver circuit etc. of a transmission line by an external electric field.

Figure 39A:
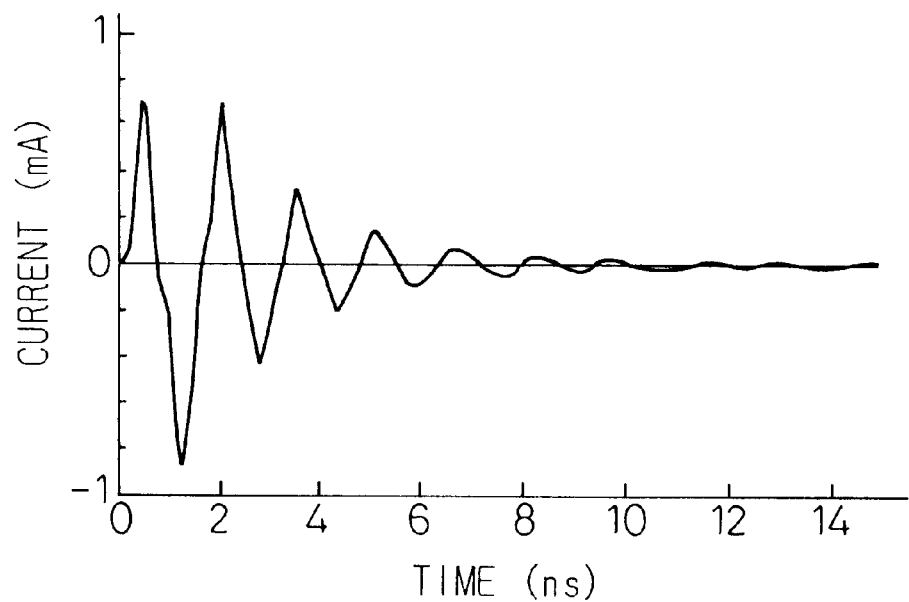
FIGS. 39A and 39B are first explanatory views of simulation.
Figure 39B:
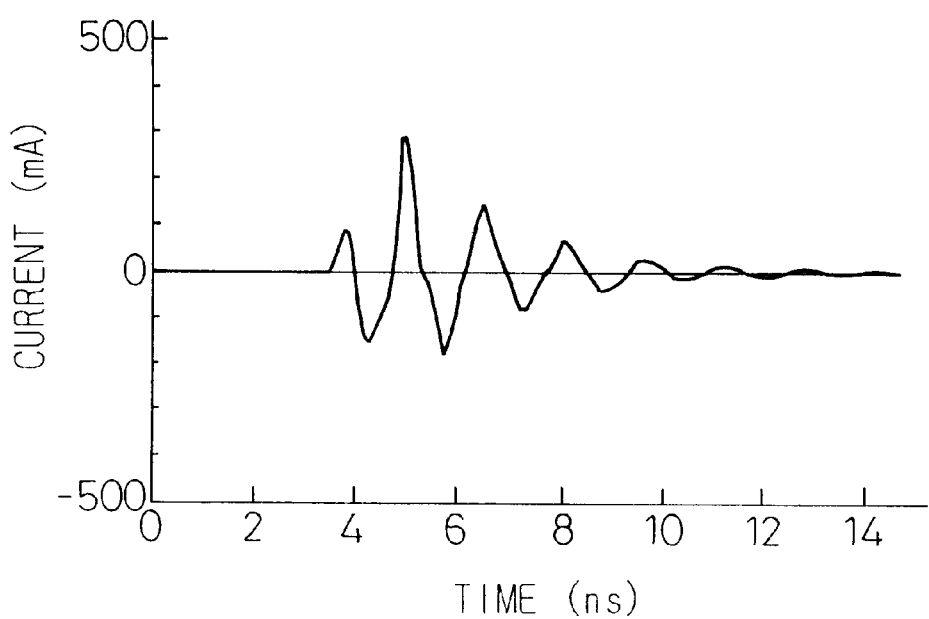
Figure 40:
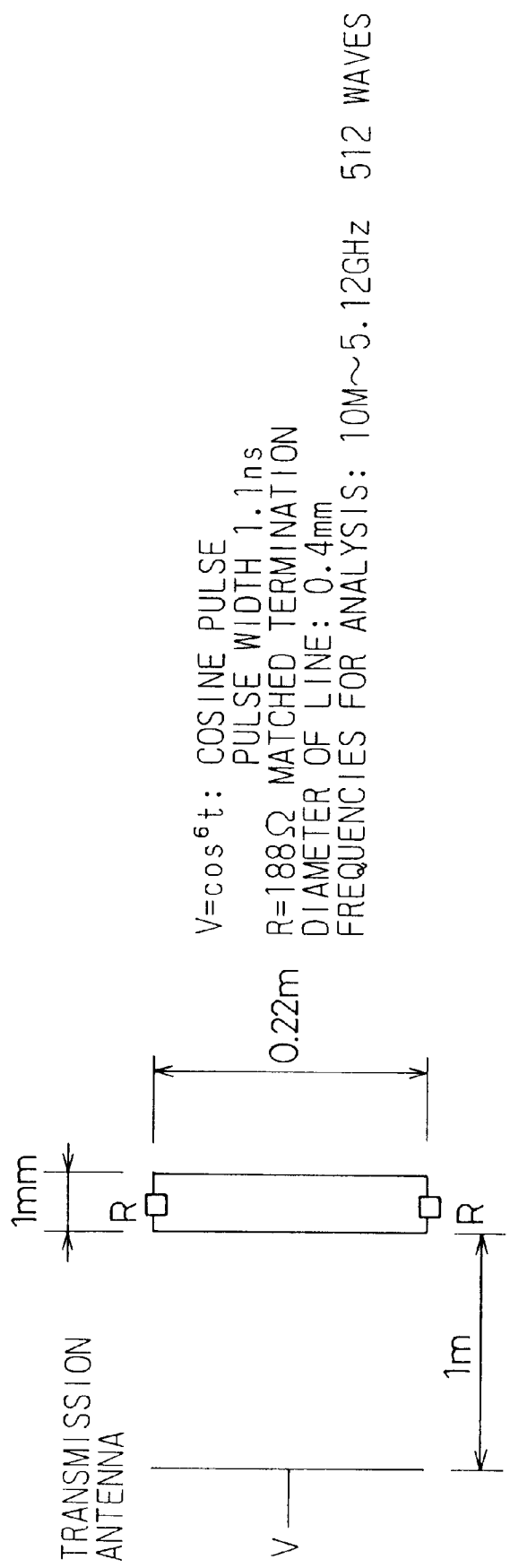
FIG. 40 is a second explanatory view of simulation.

FIGS. 39A and 39B illustrate the results of simulation of the processing of the "processing for calculating coupling of transmission line". This simulation was carried out under the conditions illustrated in FIG. 40.

FIG. 39A shows the transmission current of the assumed transmission antenna; and FIG. 39B shows the current of the transmission line flowing in response to this transmission current. In this simulation it is simulated that the current flows with the same mode through a transmission line positioned away from the transmission antenna by 1 meter accompanied by a time lag corresponding to the propagation time of the radio wave, thus the legitimacy of the "processing for calculating coupling of transmission line" could be verified.

When a wave source changing in time is given in this way, the simulation apparatus 1 of the present invention transforms this wave source to the frequency domain, finds the mutual impedance at an extremely high speed by using the approximate expression, simulates the intensity of the electromagnetic field etc. in the transformed frequency domain by using the moment method, and performs processing for inversely transforming the result of the simulation to the time domain.

This embodiment assumed the solution of the simultaneous equations under the moment method as illustrated in FIG. 26 taking only the mutual impedance into account, but when use is made of the simultaneous equations under the moment method as shown in FIG. 41 taking the mutual admittance and mutual reaction into account, the mutual admittance and mutual reaction may also be found at a high speed by using the approximate expressions mentioned above.

Here, in the equation illustrated in FIG. 41, $I_{c,n}$ is a current flowing through a metal object, $I_{d,n}$ is a current flowing on the surface of a dielectric object, and $M_n$ is a magnetic current flowing on the surface of the dielectric object. Here, the character 0 at the top right represents a value in air, the character d of the top right represents the value in the dielectric object, the suffix c represents a metal object, and the suffix d represents a dielectric object.

Further, in this embodiment, after the equations under the moment method were solved, the voltage spectrum etc. were found by the "processing for calculating voltage", "processing for calculating electromagnetic field", "processing for calculating voltage between conductors", and "processing for calculating coupling of transmission line", and the resultant voltage spectrum etc. were subjected to inverse Fourier transform, but the present invention is not limited to this. It is also possible to immediately apply the inverse Fourier transform to the calculated harmonic current after solving the equations under the moment method so as to return this to the current of the time domain, and then, in this time domain, execute the processings carried out at the above "processing for calculating voltage", "processing for calculating electromagnetic field", "processing for calculating voltage between conductors", and "processing for calculating coupling of transmission line".

One of the tests for electronic apparatus is whether or not it is affected by the electric field radiated from an antenna (immunity test).

Figure 42:
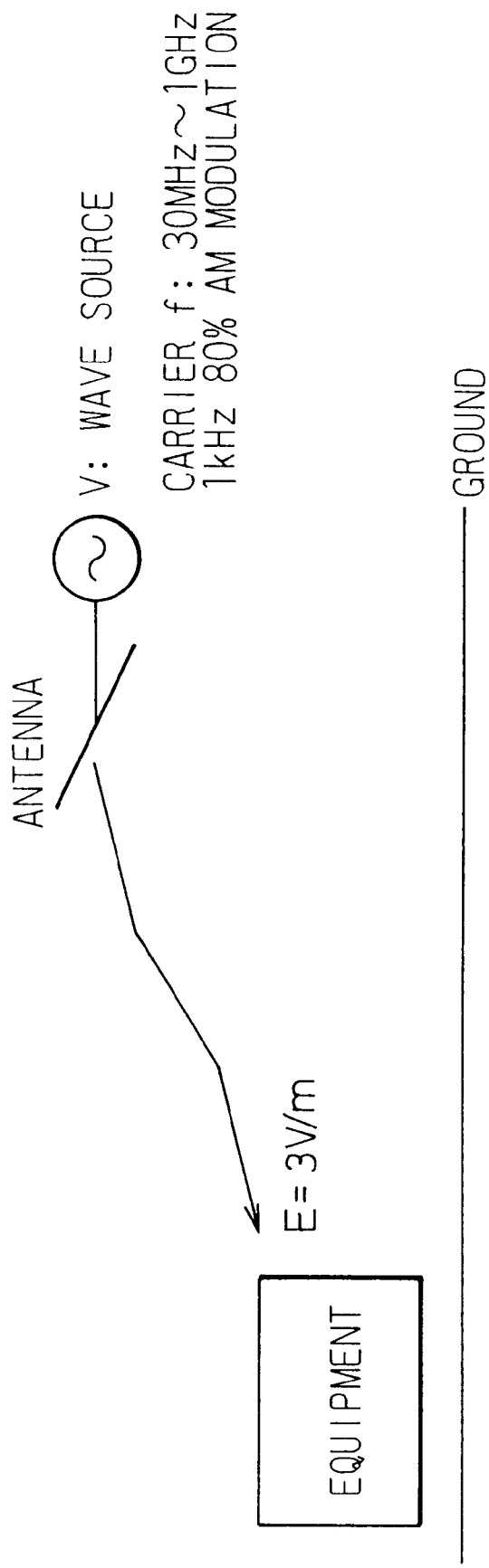
FIG. 42 is a first explanatory view of analysis of radiation of an antenna.

This test is carried out by, for example, as shown in FIG. 42, modulating a carrier signal having a frequency of 30 MHz to 1 GHz by a modulation wave having a frequency of 1 kHz and with a modulation degree of 80% and radiating the modulation wave onto that electronic apparatus.

When it is intended to perform this test by the above method, the time series data of the wave source becomes enormous. This is because, if it is intended to segment one period of 1 GHz by 20 points, at 1 kHz, a large amount of data up to $20 \times 10^6$ points becomes necessary.

Therefore, in such a case, when the angular frequency of the carrier signal is defined as $\omega_c$, an amplitude of the carrier signal is defined as $V_c$, the angular frequency of the modulation wave is defined as $\omega_m$, and the modulation rate of the modulation wave is defined as m, attention is paid to the fact that the wave source of the antenna can be separated (here, a relationship of "cost=jsint" is used) into three wave sources having different frequencies as illustrated in FIG. 43 according to:

$$V = V_c(1 + m\sin\omega_m t)\sin\omega_c t \qquad \text{Formula 4}$$
$$= V_c\sin\omega_c t + (mV_c/2)\cos(\omega_c - \omega_m)t -$$
$$(mV_c/2)\cos(\omega_c + \omega_m)t$$

and the moment method is sequentially executed with respect to these three wave sources.

Then, when the currents of the frequency domain flowing in the element m as illustrated in FIG. 44A are found by this moment method, the currents of the time domain as illustrated in FIG. 44B are found from the found currents and then are added to find the current flowing in the element m.

Due to this, the current of the time domain and the magnetic current of the time domain flowing in each element can be found without using Fourier transform for a wave source outputting a wave obtained by modulating a carrier signal. Then, it becomes possible to find the voltage of time domain produced at a specified element and the electric field and magnetic field of the time domain produced at the specified point from the current of the time domain and the magnetic current of the time domain before combination and after combination found in the above way, therefore it becomes possible to simulate the influence exerted upon the electronic apparatus by the wave source.

For example, finding the current of the time domain produced at a specified element by combining the found currents of the time domain, finding the voltage between conductors of the time domain according to the calculation equation derived from the voltage generated by a resistor imaginarily inserted between conductors when the resistance is made infinite large, using the currents of the time domain before the combination, calculating the current and voltage of the frequency domain received by the receiver circuit etc. of the transmission line according to the equation found by "C. D. Taylor" and then combining the calculated values so that the current and voltage of the time domain affecting the receiver circuit etc. of the transmission line due to the wave source are calculated.

In this way, it becomes possible to simulate at a high speed a test of whether or not an electronic apparatus is affected by the radiation of an electric field from the antenna shown in FIG. 42.

As explained above, according to the present invention, at the time of execution of the moment method, the mutual impedance, the mutual admittance, and the mutual reaction are calculated at an extremely high speed by using approximate expressions. Then, when a wave source changing in time is given, the results of the calculation are transformed to the frequency domain. Then, it becomes possible to adopt a method in which the intensities of the electromagnetic field etc. in the transformed frequency domain are simulated by using the moment method, and the result of that simulation is inversely transformed to the time domain.

From this, by using the present invention, it becomes possible to simulate the influence of a wave source upon an electronic apparatus in the time domain. Accordingly, it becomes possible to analyze why an electronic apparatus radiates an undesired radio wave or noise and why an electronic apparatus malfunctions due to a radio wave or noise.

Therefore, according to the present invention, by using the moment method, it becomes possible to easily simulate the influence of a wave source outputting a wave obtained by modulating a carrier signal upon an electronic apparatus in the time domain.

Due to this, by using the present invention, it becomes possible to test on a desk whether or not an electronic apparatus will malfunction due to an electric field given to the electronic apparatus from an antenna.

What is claimed is:

1. A simulation apparatus using a moment method which divides an electronic apparatus into elements and, when given frequencies, calculates a mutual impedance between the elements and uses the mutual impedance and wave sources corresponding to said elements to simulate the current flowing in each said element according to the moment method, comprising:

transforming means for obtaining a frequency spectrum by segmenting time series data of a wave source and applying a Fourier transform thereto and setting all or part of the frequency spectrum and a frequency contained in that spectrum as an object of processing;

calculating means for selecting a sampling frequency taking the frequency set by said transforming means into account, calculating a mutual impedance at the sampling frequency, generating an approximate expression of the mutual impedance from the calculated mutual impedance and the sampling frequency, and calculating the mutual impedance at respective frequencies set by said transforming means by using the approximate expression;

simulating means for finding the current spectrum flowing in each said element according to the moment method from the mutual impedance calculated by said calculating means and the frequency spectrum set by said transforming means; and inverse transforming means for applying an inverse Fourier transform to the current spectrum found by said simulating means and outputting the result.

2. A simulation apparatus using a moment method which divides an electronic apparatus into elements and, when given frequencies, calculates a mutual impedance between the elements and uses the mutual impedance and wave sources corresponding to said elements to simulate the current flowing in each said element according to the moment method, comprising:

transforming means for obtaining a frequency spectrum by segmenting time series data of a wave source and applying a Fourier transform thereto and setting all or part of the frequency spectrum and a frequency contained in that spectrum as an object of processing;

calculating means for selecting a sampling frequency taking the frequency set by said transforming means into account, calculating the mutual impedance at the sampling frequency, generating an approximate expression of the mutual impedance from the calculated mutual impedance and the sampling frequency, and calculating the mutual impedance at respective frequencies set by said transforming means by using that approximate expression;

simulating means for finding current spectrum flowing in each said element according to the moment method from the mutual impedance calculated by said calculating means and the frequency spectrum set by said transforming means and, at the same time, finding a voltage spectrum, an electric field spectrum, and a magnetic field spectrum from the current spectrum if desired, and setting the desired spectrum among the found spectra as an object of an output; and inverse transforming means for applying an inverse Fourier transform to the spectrum to be output, set by said simulating means, and outputting the result.

3. A simulation apparatus using the moment method according to claim 2, wherein:

said simulating means calculates the voltage spectrum between conductors according to a calculation equation derived from the voltage spectrum produced by a resistor imaginarily inserted between the conductors, when the resistance is made infinitely large, where there is a necessity of finding the voltage spectrum between conductors.

4. A simulation apparatus using the moment method according to claim 2, wherein:

said simulating means executes, where there is a necessity of finding the current spectrum or the voltage spectrum at terminals of a transmission line, the moment method by removing the transmission line, finds the electric field given to the terminals by the current spectra of the elements sought according to the result of the execution, and calculates the current spectrum or the voltage spectrum at the terminals of the transmission line according to the prescribed calculation equation by using the found electric field.

5. A simulation apparatus using the moment method according to claim 1, wherein:

the transforming means segments, where it is necessary to deal with the initially charged capacitor voltage serving as a wave source, the periodic signal of the initial voltage and applies a Fourier transform thereto and the transforming means segments, where it is necessary to deal with the initially flowing inductor current serving as a wave source, the periodic signal of the initial current and applies a Fourier transform thereto.

6. A simulation apparatus using the moment method according to claim 2, wherein:

the transforming means segments, where it is necessary to deal with the initially charged capacitor voltage serving as a wave source, the periodic signal of the initial voltage and applies a Fourier transform thereto and the transforming means segments, where it is necessary to deal with the initially flowing inductor current serving as a wave source, the periodic signal of the initial current and applies a Fourier transform thereto.

7. A simulation apparatus using the moment method according to claim 1, wherein:
   said calculating means also calculates either one or both of the mutual admittance and mutual reaction;
   said simulating means executes the processing taking also the magnetic current spectrum into account in combination with the mutual admittance and mutual reaction calculated by said calculating means; and
   said inverse transforming means executes the inverse Fourier transform along with said simulating means.

8. A simulation apparatus using the moment method according to claim 2, wherein:
   said calculating means also calculates either one or both of the mutual admittance and mutual reaction by the same procedure as above in addition to the mutual impedance;
   said simulating means executes the processing taking also the magnetic current spectrum into account in combination with the mutual admittance and the mutual reaction calculated by said calculating means; and
   said inverse transforming means executes the inverse Fourier transform along with said simulating means.

9. A simulation apparatus using the moment method according to claim 5, wherein:
   said calculating means also calculates either one or both of the mutual admittance and mutual reaction by the same procedure as above in addition to the mutual impedance;
   said simulating means executes the processing taking also the magnetic current spectrum into account in combination with the mutual admittance and mutual reaction calculated by said calculating means; and
   said inverse transforming means executes the inverse Fourier transform along with said simulating means.

10. A simulation apparatus using the moment method according to claim 6, wherein:
    said calculating means also calculates either one or both of the mutual admittance and mutual reaction;
    said simulating means executes the processing taking also the magnetic current spectrum into account in combination with the mutual admittance and mutual reaction calculated by said calculating means; and
    said inverse transforming means executes the inverse Fourier transform along with said simulating means.

11. A simulation apparatus using the moment method according to claim 1, wherein:
    said calculating means approximates a mutual impedance $Z_{ij}$ between an element i and an element j by:

$$Z_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j; and j: imaginary part).

12. A simulation apparatus using the moment method according to claim 2, wherein:
    said calculating means approximates a mutual impedance $Z_{ij}$ between an element i and an element j by:

$$Z_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j; and j: imaginary part).

13. A simulation apparatus using the moment method according to claim 5, wherein:
    said calculating means approximates a mutual impedance $Z_{ij}$ between an element i and an element j by:

$$Z_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j; and j: imaginary part).

14. A simulation apparatus using the moment method according to claim 6, wherein:
    said calculating means approximates a mutual impedance $Z_{ij}$ between an element i and an element j by:

$$Z_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j; and j: imaginary part).

15. A simulation apparatus using the moment method according to claim 7, wherein:
    said calculating means approximates a mutual impedance $Z_{ij}$ between an element i and an element j by:

$$Z_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j; and j: imaginary part).

16. A simulation apparatus using the moment method according to claim 8, wherein:
    said calculating means approximates a mutual impedance $Z_{ij}$ between an element i and an element j by:

$$Z_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j; and j: imaginary part).

17. A simulation apparatus using the moment method according to claim 9, wherein:
    said calculating means approximates a mutual impedance $Z_{ij}$ between an element i and an element j by:

$$Z_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j; and j: imaginary part).

18. A simulation apparatus using the moment method according to claim 10, wherein:
    said calculating means approximates a mutual impedance $Z_{ij}$ between an element i and an element j by:

$$Z_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j; and j: imaginary part).

19. A simulation apparatus using the moment method according to claim 7, wherein:
    said calculating means approximates a mutual admittance $Y_{ij}$ between the element i and element j by:

$$Y_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j; and j: imaginary part).

20. A simulation apparatus using the moment method according to claim 8, wherein:

said calculating means approximates a mutual admittance $Y_{ij}$ between the element i and element j by:

$$Y_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j; and j: imaginary part).

21. A simulation apparatus using the moment method according to claim 9, wherein:

said calculating means approximates a mutual admittance $Y_{ij}$ between the element i and element j by:

$$Y_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j; and j: imaginary part).

22. A simulation apparatus using the moment method according to claim 10, wherein:

said calculating means approximates a mutual admittance $Y_{ij}$ between the element i and element j by:

$$Y_{ij}=e^{-jkr_0}[(a_0+a_1f^2+a_2f^4+a_3f^6+a_4f^8+\ldots)+j(b_0f^{-1}+b_1f+b_2f^3+b_3f^5+b_4f^7+\ldots)]$$

(where f: frequency; k: wave number; $r_0$: distance between element i and element j; and j: imaginary part).

23. A simulation apparatus using the moment method according to claim 7, wherein:

said calculating means approximates a mutual reaction $B_{ij}$ between the element i and element j by:

$$B_{ij}=e^{-jkr_0}[(a_0+a_1f^2+a_2f^4+a_3f^6+a_4f^8+\ldots)+j(b_0f+b_1f^3+b_2f^5+b_3f^7+b_4f^9+\ldots)]$$

(where f: frequency; k: wave number; $r_0$: distance between element i and element j; and j: imaginary part).

24. A simulation apparatus using the moment method according to claim 8, wherein:

said calculating means approximates a mutual reaction $B_{ij}$ between the element i and element j by:

$$B_{ij}=e^{-jkr_0}[(a_0+a_1f^2+a_2f^4+a_3f^6+a_4f^8+\ldots)+j(b_0f+b_1f^3+b_2f^5+b_3f^7+b_4f^9+\ldots)]$$

(where f: frequency; k: wave number; $r_0$: distance between element i and element j; and j: imaginary part).

25. A simulation apparatus using the moment method according to claim 9, wherein:

said calculating means approximates a mutual reaction $B_{ij}$ between the element i and element j by:

$$B_{ij}=e^{-jkr_0}[(a_0+a_1f^2+a_2f^4+a_3f^6+a_4f^8+\ldots)+j(b_0f+b_1f^3+b_2f^5+b_3f^7+b_4f^9+\ldots)]$$

(where f: frequency; k: wave number; $r_0$: distance between element i and element j; and j: imaginary part).

26. A simulation apparatus using the moment method according to claim 10, wherein:

said calculating means approximates a mutual reaction $B_{ij}$ between the element i and element j by:

$$B_{ij}=e^{-jkr_0}[(a_0+a_1f^2+a_2f^4+a_3f^6+a_4f^8+\ldots)+j(b_0f+b_1f^3+b_2f^5+b_3f^7+b_4f^9+\ldots)]$$

(where f: frequency; k: wave number; $r_0$: distance between element i and element j; and j: imaginary part).

27. A simulation apparatus using a moment method which divides an electronic apparatus into elements and, when given frequencies, calculates a mutual impedance between the elements and uses the mutual impedance and wave sources corresponding to said elements to simulate a current flowing in each said element according to the moment method, comprising:

separating means for separating a wave source into three wave sources having different frequencies specified by a frequency of a carrier signal and a frequency of a modulation signal where a wave obtained by modulating a carrier signal is used as the wave source;

simulating means for finding the current of the frequency domain flowing in each said element by applying the moment method to the wave sources separated by said separating means; and calculating means for calculating the current of the time domain from the current of the frequency domain found by said simulating means.

28. A simulation apparatus using the moment method according to claim 27, wherein:

said simulating means also finds the magnetic current of the frequency domain by applying the moment taking also into account either one or both of the mutual admittance and mutual reaction; and said calculating means also calculates the magnetic current of the time domain from the magnetic current of the frequency domain found by said simulating means.

29. A simulation method using a moment method which divides an electronic apparatus into elements and, when given frequencies, calculates a mutual impedance between the elements and simulates a current flowing in each said element according to the moment method from the mutual impedance and wave sources corresponding to said elements, comprising:

a first process obtaining a frequency spectrum by segmenting time series data of the wave source and applying a Fourier transform thereto and setting all or part of the frequency spectrum and a frequency contained in that spectrum as the processing object;

a second process selecting a sampling frequency taking the frequency set by the first process into account, calculating the mutual impedance at the sampling frequency, generating an approximate expression of the mutual impedance from the calculated mutual impedance and the sampling frequency, and calculating the mutual impedance at respective frequencies set by the first process by using that approximate expression;

a third process finding the current spectrum flowing in each said element according to the moment method from the mutual impedance calculated by the second process and the frequency spectrum set by the first process; and a fourth process applying an inverse Fourier transform to the current spectrum found by the third process and outputting the result.

30. A simulation method using a moment method which divides an electronic apparatus into elements and, when given frequencies, calculates a mutual impedance between the elements and simulates current flowing in each said element according to the moment method from the mutual impedance and wave sources corresponding to said elements, comprising:

a first process obtaining a frequency spectrum by segmenting time series data of the wave sources and applying Fourier transform thereto and setting all or part of the frequency spectrum and a frequency contained in that spectrum as the processing object;

a second process selecting a sampling frequency taking the frequency set by the first process into account, calculating the mutual impedance at the sampling frequency, generating an approximate expression of the mutual impedance from the calculated mutual impedance and the sampling frequency, and calculating the mutual impedance at respective frequencies set by the first process by using the approximate expression;

a third process finding the current spectrum flowing in each said element according to the moment method from the mutual impedance calculated by the second process and the frequency spectrum set by the first process and, at the same time, finding the voltage spectrum, the electric field spectrum, and the magnetic field spectrum from the current spectrum, if desired, and setting the desired spectrum among the found spectra as an object of output; and a fourth process applying an inverse Fourier transform to the spectrum set as the object of output by the third process and outputting the result.

31. A simulation method using the moment method according to claim 29, wherein:

in the second process, in addition to the mutual impedance, also calculating either one or both of the mutual admittance and the mutual reaction;

in the third process, executing the processing taking also the magnetic current spectrum into account in combination with the mutual admittance and mutual reaction calculated by the second process; and in the fourth process executing the inverse Fourier transform.

32. A simulation method using the moment method according to claim 30, wherein:

the second process also calculates either one or both of the mutual admittance and the mutual reaction;

in the third process, the processing is executed taking also the magnetic current spectrum into account in combination with the calculated mutual admittance and mutual reaction at the second process; and in the fourth process executing the inverse Fourier transform.

33. A simulation method using a moment method which divides an electronic apparatus into elements and, when given frequencies, calculates a mutual impedance between elements and simulates current flowing in each said element according to the moment method from the mutual impedance and wave sources corresponding to said elements, comprising:

a first process separating a wave source into three wave sources having different frequencies specified by a frequency of a carrier signal and a frequency of a modulation signal where a wave obtained by modulating a carrier signal is used as the wave source;

a second process finding the current of the frequency domain flowing in each said element by applying the moment method to the wave sources separated by the first process; and a third process calculating the current of the time domain from the current of the frequency domain found by the second process.

34. A simulation method using the moment method according to claim 33, wherein:

said second process also determines the magnetic current of the frequency domain by applying the moment method taking also either one or both of the mutual admittance and mutual reaction into account in addition to the mutual impedance; and said third process also calculates the magnetic current of the time domain from the magnetic current of the frequency domain found at the second process.

35. A memory medium storing a computer program using a moment method which divides an electronic apparatus into elements and, when given frequencies, calculates a mutual impedance between the elements and simulates a current flowing in each said element according to the moment method from the mutual impedance and wave sources corresponding to said elements, the program:

obtaining a frequency spectrum by segmenting time series data of the wave sources and applying a Fourier transform thereto and setting all or part of the frequency spectrum and a frequency contained in that spectrum as the processing object;

selecting a sampling frequency taking the frequency set by the first process into account, calculating the mutual impedance at the sampling frequency, generating an approximate expression of the mutual impedance from the calculated mutual impedance and the sampling frequency, and calculating the mutual impedance at respective frequencies set by the first process by using that approximate expression;

finding the current spectrum flowing in each said element according to the moment method from the calculated mutual impedance based on the set frequency spectrum; and applying an inverse Fourier transform to the current spectrum found by the third process and outputting the result.

36. A memory medium storing a program according to claim 35, the program further using a moment method which divides an electronic apparatus into elements and, when given frequencies, calculates a mutual impedance between the elements and simulates current flowing in each said element according to the moment method from the mutual impedance and wave sources corresponding to said elements, the program:

obtaining a frequency spectrum by segmenting time series data of the wave sources and applying Fourier transform thereto and setting all or part of the frequency spectrum and a frequency contained in that spectrum as the processing object;

selecting a sampling frequency taking the frequency set by the first process into account, calculating the mutual impedance at the sampling frequency, generating an approximate expression of the mutual impedance from the calculated mutual impedance and the sampling frequency, and calculating the mutual impedance at respective frequencies set by the first process by using the approximate expression;

at the time of finding the current spectrum flowing in each said element, finding the voltage spectrum, the electric field spectrum, and the magnetic field spectrum from the current spectrum, if desired, and setting the desired spectrum among the found spectra as an object of output; and applying an inverse Fourier transform to the spectrum set as the object of output and outputting the result.

37. A storage medium using the moment method according to claim 35, wherein:
   in addition to the mutual impedance, also calculating either one or both of the mutual admittance and the mutual reaction;
   executing the processing taking also into account the magnetic current spectrum in combination with the calculated mutual admittance and mutual reaction; and
   executing the inverse Fourier transform.

38. A storage medium according to claim 36, wherein:
   in addition to the mutual impedance, also calculating either one or both of the mutual admittance and the mutual reaction;
   executing the processing taking also into account the magnetic current spectrum in combination with the calculated mutual admittance and mutual reaction; and
   executing the inverse Fourier transform.

39. A storage medium storing a program which divides an electronic apparatus into elements and, when given frequencies, calculates a mutual impedance between elements and simulates current flowing in each said element according to the moment method from the mutual impedance and wave sources corresponding to said elements, the program:
   separating a wave source into three wave sources having different frequencies specified by a frequency of a carrier signal and a frequency of a modulation signal, wherein a wave obtained by modulating a carrier signal is used as the wave source;
   determining the current of the frequency domain flowing in each said element by applying the moment method to the three separated wave sources; and
   calculating the current of the time domain from the determined current of the frequency domain.

40. A storage medium according to claim 39, further comprising:
   determining the magnetic current of the frequency domain by applying the moment method, taking also into account either one or both of the mutual admittance and mutual reaction in addition to the mutual impedance; and
   calculating the magnetic current of the time domain from the determined magnetic current of the frequency domain.

* * * * *